United States Patent
Le et al.

(10) Patent No.: US 10,144,515 B2
(45) Date of Patent: Dec. 4, 2018

(54) AIRCRAFT SEATING ASSEMBLY AND COMPONENTS

(71) Applicant: Encore Seats, Inc., Huntington Beach, CA (US)

(72) Inventors: Gary Tien Le, San Dimas, CA (US); Wade Franklin DeLaney, Costa Mesa, CA (US); Elijah Dobrusin, Long Beach, CA (US); Aram Aris Krikorian, Ladera Ranch, CA (US); Thomas Rodolph Eaton, Echo Park, CA (US); Christopher Michael Gumbleton, Riverside, CA (US)

(73) Assignee: ENCORE SEATS, INC., Aliso Viejo, CA (US)

( * ) Notice: Subject to any disclaimer, the term of this patent is extended or adjusted under 35 U.S.C. 154(b) by 0 days.

(21) Appl. No.: 15/476,226

(22) Filed: Mar. 31, 2017

(65) Prior Publication Data
US 2018/0050803 A1 Feb. 22, 2018

Related U.S. Application Data

(60) Provisional application No. 62/317,374, filed on Apr. 1, 2016.

(51) Int. Cl.
*A47C 7/62* (2006.01)
*B64D 11/06* (2006.01)
(Continued)

(52) U.S. Cl.
CPC .......... *B64D 11/0642* (2014.12); *B60N 2/809* (2018.02); *B60N 2/838* (2018.02);
(Continued)

(58) Field of Classification Search
CPC ............ B64D 11/0642; B64D 11/0648; B64D 11/0647; B64D 11/0638; B64D 11/00152; B60N 3/004; B60N 3/103; B60N 2/42709
(Continued)

(56) References Cited

U.S. PATENT DOCUMENTS 345,710 A 7/1886 Mason
2,223,532 A * 12/1940 Sallop ...................... B60N 2/58
297/188.06 X (Continued)

FOREIGN PATENT DOCUMENTS

DE 3 433 589 3/1986
DE 100 29 624 1/2002
(Continued)

OTHER PUBLICATIONS

International Search Report and Written Opinion in co-pending Patent Application No. PCT/US2014/033071, dated Jul. 28, 2014, in 11 pages.
(Continued)

*Primary Examiner* — Rodney B White
(74) *Attorney, Agent, or Firm* — Knobbe Martens Olson & Bear LLP

(57) ABSTRACT

Components and systems of an aircraft seating assembly are disclosed. The aircraft seating assembly can include an adjustable headrest that allows the headrest to be translated and/or rotated relative to a seat, a storage sleeve, and/or a spreader. The aircraft seating assembly can include an energy absorption system. The energy absorption system can include bracket which can control pivoting of a seat back relative to the bracket when subject to forces exceeding a threshold force. The energy absorption system can include a movable wall coupled to the seat.

18 Claims, 17 Drawing Sheets

(51) Int. Cl.
*B60R 7/00* (2006.01)
*B60R 7/04* (2006.01)
*B60N 2/838* (2018.01)
*B60N 2/809* (2018.01)
*B60N 2/868* (2018.01)
*B60N 2/885* (2018.01)

(52) U.S. Cl.
CPC ............. *B60N 2/868* (2018.02); *B60N 2/885* (2018.02); *B60R 7/005* (2013.01); *B60R 7/043* (2013.01); *B64D 11/0605* (2014.12); *B64D 11/0619* (2014.12); *B64D 11/0636* (2014.12); *B64D 11/0647* (2014.12); *B64D 11/0648* (2014.12)

(58) Field of Classification Search
USPC .... 297/163, 188.06, 188.08, 188.11, 188.12, 297/188.13, 216.2
See application file for complete search history.

(56) References Cited

U.S. PATENT DOCUMENTS

| | | | |
|---|---|---|---|
| 2,507,842 A * | 5/1950 | Waddill | B60R 7/043 224/547 |
| 2,619,395 A | 11/1952 | Kent | |
| 2,767,895 A * | 10/1956 | Smith | B60R 7/043 224/275 |
| D180,710 S | 7/1957 | De Gludice | |
| 3,049,374 A | 8/1962 | Nance | |
| 3,088,771 A * | 5/1963 | Weigle | B60N 3/08 224/275 |
| D198,498 S | 6/1964 | Malitte | |
| D198,783 S | 8/1964 | Barecki | |
| 3,333,890 A | 8/1967 | Whitman | |
| 3,393,941 A | 7/1968 | Grosfillex | |
| 3,533,178 A * | 10/1970 | Strohmaier | B60R 13/10 40/593 |
| 3,615,118 A | 10/1971 | Buxton | |
| 3,653,713 A | 4/1972 | Reason et al. | |
| 3,785,600 A | 1/1974 | Padovano | |
| 3,795,422 A | 3/1974 | Robinson et al. | |
| D239,148 S | 3/1976 | Smith et al. | |
| 4,004,836 A | 1/1977 | Kristensson | |
| 4,097,088 A | 6/1978 | Meiller | |
| D250,071 S | 10/1978 | Dickerson | |
| 4,184,276 A * | 1/1980 | Hernandez | G09F 1/10 40/593 |
| 4,229,040 A | 10/1980 | Howell et al. | |
| D257,707 S | 12/1980 | Marrujo | |
| 4,307,913 A | 12/1981 | Spiegelhoff | |
| D267,372 S | 12/1982 | Long et al. | |
| D268,972 S | 5/1983 | White | |
| 4,460,215 A | 7/1984 | Chamberlain et al. | |
| 4,466,659 A * | 8/1984 | Carpentier | A47C 7/70 297/188.06 X |
| 4,489,978 A | 12/1984 | Brennan | |
| 4,511,178 A | 4/1985 | Brennan | |
| 4,526,421 A | 7/1985 | Brennan et al. | |
| 4,681,369 A | 7/1987 | Simpson | |
| 4,718,719 A | 1/1988 | Brennan | |
| 4,723,732 A | 2/1988 | Gorges | |
| 4,726,621 A | 2/1988 | Muller | |
| 4,757,928 A * | 7/1988 | Browne | B60N 3/103 224/275 |
| 4,836,602 A | 6/1989 | D'Almada Remedios et al. | |
| 4,861,103 A | 8/1989 | Vallee | |
| 4,892,355 A | 1/1990 | Fend | |
| D306,520 S * | 3/1990 | McCarthy | D12/133 |
| 4,911,381 A | 3/1990 | Cannon et al. | |
| 4,936,527 A | 6/1990 | Gorges | |
| 5,118,163 A | 6/1992 | Brittian et al. | |
| D336,379 S | 6/1993 | Veneruso | |
| 5,292,174 A | 3/1994 | Ohnuma | |
| 5,342,112 A | 8/1994 | Padovan | |
| 5,352,020 A * | 10/1994 | Wade | B64D 11/0643 297/423.26 |
| 5,375,907 A | 12/1994 | Rogers et al. | |
| 5,409,186 A | 4/1995 | Chow | |
| 5,485,976 A * | 1/1996 | Creed | B64D 11/06 244/118.6 |
| 5,499,783 A | 3/1996 | Marechal | |
| 5,502,912 A * | 4/1996 | LeBoff | G09F 3/20 40/593 |
| 5,507,556 A | 4/1996 | Dixon | |
| 5,522,640 A | 6/1996 | Bilezikjian | |
| 5,531,404 A | 7/1996 | Marechal | |
| 5,553,923 A * | 9/1996 | Bilezikjian | B64D 11/06 297/232 |
| 5,575,532 A | 11/1996 | Von Rolbicki et al. | |
| 5,597,139 A | 1/1997 | Beroth | |
| 5,611,503 A | 3/1997 | Brauer | |
| 5,657,950 A | 8/1997 | Han et al. | |
| 5,695,240 A | 12/1997 | Luria | |
| 5,720,515 A | 2/1998 | Haffner | |
| 5,730,458 A | 3/1998 | Byon | |
| 5,779,312 A | 7/1998 | Nagai | |
| 5,800,013 A | 9/1998 | Branham et al. | |
| 5,836,646 A | 11/1998 | Salehi et al. | |
| 5,878,672 A * | 3/1999 | Ostermann | B60N 3/004 297/188.06 X |
| 5,984,347 A * | 11/1999 | Blanc-Rosset | B60N 3/004 297/188.06 X |
| 6,006,462 A * | 12/1999 | Lackomar | B60R 7/043 297/188.06 X |
| 6,065,806 A | 5/2000 | Miyaguchi | |
| 6,076,768 A | 6/2000 | Durand et al. | |
| 6,092,705 A | 7/2000 | Meritt | |
| D430,761 S | 9/2000 | Haney | |
| 6,176,547 B1 | 1/2001 | Francois et al. | |
| 6,216,927 B1 * | 4/2001 | Meritt | B60R 11/02 297/188.06 X |
| D441,210 S | 5/2001 | Mitjans | |
| 6,247,753 B1 | 6/2001 | Alvestad | |
| 6,279,992 B1 | 8/2001 | Plocher | |
| 6,450,571 B1 | 9/2002 | Canni et al. | |
| 6,481,798 B2 | 11/2002 | Romca | |
| 6,494,533 B1 | 12/2002 | Bohler | |
| 6,550,861 B1 | 4/2003 | Williamson | |
| 6,588,848 B2 | 7/2003 | Cheng | |
| 6,592,179 B1 | 7/2003 | Miyazaki | |
| 6,641,214 B2 | 11/2003 | Veneruso | |
| 6,644,738 B2 | 11/2003 | Williamson | |
| 6,669,295 B2 | 12/2003 | Williamson | |
| 6,672,661 B2 | 1/2004 | Williamson | |
| D486,330 S | 2/2004 | Lamin et al. | |
| 6,688,694 B1 | 2/2004 | Yu | |
| 6,715,834 B1 | 4/2004 | Liao | |
| 6,739,552 B2 | 5/2004 | Sankrithi et al. | |
| 6,739,664 B2 | 5/2004 | Kinoshita | |
| 6,739,671 B2 | 5/2004 | De Maina | |
| 6,742,840 B2 | 6/2004 | Bentley | |
| 6,749,266 B2 | 6/2004 | Williamson | |
| 6,761,398 B2 | 7/2004 | Bentley | |
| 6,763,986 B2 * | 7/2004 | Santos | A45C 9/00 224/275 |
| 6,776,457 B2 | 8/2004 | Muin | |
| 6,824,213 B2 | 11/2004 | Skelly | |
| 6,827,026 B2 | 12/2004 | Williamson et al. | |
| 6,886,282 B2 * | 5/2005 | Sumner, III | G09F 15/0025 40/593 |
| D505,796 S | 6/2005 | Johnson | |
| 6,902,238 B1 | 6/2005 | Abt | |
| 6,960,110 B2 | 11/2005 | Hough | |
| 6,994,401 B2 | 2/2006 | Fischer et al. | |
| 7,066,551 B2 | 6/2006 | Johnson | |
| 7,073,449 B2 | 7/2006 | Pipkin | |
| 7,134,713 B1 | 11/2006 | Tseng | |
| 7,152,719 B2 | 12/2006 | Knaust | |
| 7,178,867 B2 | 2/2007 | Hough | |
| 7,182,402 B1 | 2/2007 | Ahad | |
| 7,252,569 B2 | 8/2007 | Everhart et al. | |

(56) References Cited

U.S. PATENT DOCUMENTS

| | | | |
|---|---|---|---|
| 7,261,369 B2 | 8/2007 | Ahad | |
| 7,296,858 B2 | 11/2007 | Ruspa | |
| 7,360,649 B2 * | 4/2008 | Swaim | A45C 7/0095 |
| | | | 297/188.06 X |
| 7,390,062 B2 | 6/2008 | Hahn | |
| 7,399,037 B2 | 7/2008 | Schumacher et al. | |
| 7,500,716 B2 | 3/2009 | Guerin et al. | |
| 7,562,408 B1 * | 7/2009 | Johnson | B60P 3/38 |
| | | | 224/572 |
| 7,611,198 B2 | 11/2009 | Schweizer | |
| 7,621,593 B2 | 11/2009 | Dickinson | |
| D605,863 S | 12/2009 | Aruga | |
| D606,344 S | 12/2009 | Aruga et al. | |
| 7,716,797 B2 | 5/2010 | Kismarton et al. | |
| 7,726,607 B2 | 6/2010 | Schumacher | |
| 7,810,880 B2 * | 10/2010 | Spellman | B60R 11/00 |
| | | | 297/188.06 |
| 7,866,752 B1 | 1/2011 | Heuser | |
| 7,871,039 B2 | 1/2011 | Fullerton et al. | |
| D632,105 S | 2/2011 | Aruga et al. | |
| 7,954,762 B2 | 6/2011 | Boren et al. | |
| 7,971,929 B2 | 7/2011 | Kennard et al. | |
| 8,016,361 B2 | 9/2011 | Kismarton et al. | |
| 8,020,936 B2 | 9/2011 | Asami et al. | |
| 8,028,958 B2 | 10/2011 | Kneller et al. | |
| 8,047,613 B1 | 11/2011 | Ahad | |
| 8,087,613 B2 | 1/2012 | Fullerton et al. | |
| 8,141,948 B2 | 3/2012 | Cassellia et al. | |
| 8,146,999 B2 | 4/2012 | Ferguson et al. | |
| 8,186,760 B2 | 5/2012 | Kneller et al. | |
| 8,205,833 B2 | 6/2012 | Kismarton et al. | |
| D665,182 S | 8/2012 | Hilton et al. | |
| 8,272,694 B2 * | 9/2012 | Hawkins | B60N 2/181 |
| | | | 297/317 |
| 8,336,965 B2 | 12/2012 | Kismarton et al. | |
| 8,393,574 B2 | 3/2013 | Kismarton | |
| 8,393,680 B2 | 3/2013 | Zimmerman et al. | |
| 8,397,963 B2 * | 3/2013 | Singh | B60N 3/004 |
| | | | 297/188.06 X |
| 8,444,226 B2 | 5/2013 | Driessen et al. | |
| 8,464,982 B2 | 6/2013 | Raybell et al. | |
| D686,422 S | 7/2013 | Robinson | |
| 8,506,015 B2 | 8/2013 | Le et al. | |
| 8,517,464 B2 | 8/2013 | Ruiz | |
| 8,544,796 B2 | 10/2013 | Pozzi et al. | |
| 8,550,564 B1 | 10/2013 | Kismarton et al. | |
| 8,590,126 B2 | 11/2013 | Kismarton et al. | |
| 8,596,723 B2 | 12/2013 | Ahad | |
| 8,596,724 B1 | 12/2013 | Ahad | |
| 8,602,499 B2 | 12/2013 | Driessen et al. | |
| 8,613,479 B2 | 12/2013 | Schurg et al. | |
| 8,636,003 B2 | 1/2014 | Deutscher et al. | |
| D701,213 S | 3/2014 | Pajic | |
| 8,667,904 B2 | 3/2014 | Pajic | |
| 8,696,066 B2 | 4/2014 | Mizobata | |
| 8,702,163 B2 | 4/2014 | Westerink | |
| 8,714,647 B2 | 5/2014 | Westerink | |
| 8,733,840 B2 | 5/2014 | Westerink et al. | |
| D707,999 S | 7/2014 | Takashi et al. | |
| 8,763,976 B1 | 7/2014 | Jachim | |
| 8,782,835 B2 | 7/2014 | Pozzi | |
| 8,826,830 B2 | 9/2014 | Pajic | |
| 8,851,565 B2 | 10/2014 | Hontz et al. | |
| 8,864,227 B2 | 10/2014 | Funke et al. | |
| 8,905,470 B2 | 12/2014 | Shih et al. | |
| 8,931,847 B2 | 1/2015 | Cailleteau et al. | |
| 8,934,063 B2 | 1/2015 | Boyer, Jr. | |
| 8,936,307 B2 | 1/2015 | Heredia | |
| D723,819 S | 3/2015 | Takahashi et al. | |
| D723,822 S | 3/2015 | Cai et al. | |
| D724,338 S | 3/2015 | Nicholas | |
| D724,339 S | 3/2015 | Cai et al. | |
| 8,974,002 B2 | 3/2015 | Le et al. | |
| 8,991,930 B2 | 3/2015 | Laframboise | |
| D725,927 S | 4/2015 | Carter | |
| 9,016,627 B2 | 4/2015 | Margis et al. | |
| 9,045,096 B2 | 6/2015 | Procter et al. | |
| 9,067,682 B2 | 6/2015 | Pajic | |
| 9,090,352 B2 | 7/2015 | Saada et al. | |
| 9,138,055 B2 | 9/2015 | Curtis et al. | |
| 9,167,905 B2 | 10/2015 | Pajic | |
| 9,168,876 B2 | 10/2015 | Pajic | |
| 9,242,733 B2 | 1/2016 | Pajic | |
| D750,392 S | 3/2016 | Wilkens | |
| 9,290,271 B2 | 3/2016 | Schurg et al. | |
| 9,327,836 B2 | 5/2016 | Weitzel et al. | |
| 9,352,840 B2 | 5/2016 | Schultheis | |
| 9,376,047 B2 | 6/2016 | Ulbrich-Gasparevic et al. | |
| 9,403,596 B2 | 8/2016 | Pajic | |
| 9,409,647 B2 | 8/2016 | Pajic | |
| 9,415,874 B2 | 8/2016 | Curtis et al. | |
| 9,511,862 B2 | 12/2016 | Thiele et al. | |
| 9,630,717 B2 | 4/2017 | Wilkens | |
| 9,656,583 B2 | 5/2017 | Gaither et al. | |
| 9,764,844 B2 | 9/2017 | Le et al. | |
| 2001/0033101 A1 * | 10/2001 | Plant | A47C 1/0352 |
| | | | 297/342 |
| 2002/0063449 A1 * | 5/2002 | Plant | B60N 2/34 |
| | | | 297/68 |
| 2002/0105219 A1 | 8/2002 | Riley et al. | |
| 2003/0094542 A1 | 5/2003 | Williamson | |
| 2003/0094837 A1 | 5/2003 | Williamson | |
| 2003/0094840 A1 | 5/2003 | Williamson | |
| 2003/0094842 A1 | 5/2003 | Williamson | |
| 2004/0021349 A1 | 2/2004 | Longtin et al. | |
| 2004/0046430 A1 | 3/2004 | Plant et al. | |
| 2004/0099766 A1 | 5/2004 | Pratt | |
| 2004/0195897 A1 | 10/2004 | Mitjans | |
| 2004/0212228 A1 | 10/2004 | Skelly et al. | |
| 2005/0184566 A1 | 8/2005 | Baumann et al. | |
| 2005/0194828 A1 | 9/2005 | Johnson et al. | |
| 2007/0001499 A1 | 1/2007 | Smith | |
| 2007/0018494 A1 | 1/2007 | Gutosky, Jr. | |
| 2007/0200414 A1 | 8/2007 | Pozzi | |
| 2007/0205640 A1 * | 9/2007 | Pecorino | A47C 7/021 |
| | | | 297/188.06 |
| 2007/0283855 A1 | 12/2007 | Pozzi | |
| 2008/0116731 A1 | 5/2008 | Schurg et al. | |
| 2008/0169694 A1 | 7/2008 | Speh et al. | |
| 2009/0108132 A1 | 4/2009 | Guttropf | |
| 2009/0217846 A1 | 9/2009 | Harris | |
| 2010/0102170 A1 | 4/2010 | LaConte | |
| 2010/0289318 A1 * | 11/2010 | Le | B60N 2/68 |
| | | | 297/452.2 |
| 2011/0148167 A1 * | 6/2011 | Westerink | B64D 11/06 |
| | | | 297/354.12 |
| 2011/0174926 A1 | 7/2011 | Margis et al. | |
| 2011/0233339 A1 | 9/2011 | Plant et al. | |
| 2011/0266853 A1 | 11/2011 | Zhou | |
| 2011/0278885 A1 | 11/2011 | Procter et al. | |
| 2012/0091780 A1 | 4/2012 | Muller | |
| 2012/0098322 A1 | 4/2012 | Muller | |
| 2012/0138744 A1 | 6/2012 | Fullerton et al. | |
| 2012/0205329 A1 | 8/2012 | Fujita et al. | |
| 2012/0292967 A1 | 11/2012 | Cailleteau | |
| 2012/0298798 A1 | 11/2012 | Henshaw | |
| 2013/0002001 A1 | 1/2013 | Allen et al. | |
| 2013/0038103 A1 | 2/2013 | Scott | |
| 2013/0080357 A1 | 3/2013 | Boren et al. | |
| 2013/0093220 A1 | 4/2013 | Pajic | |
| 2013/0147240 A1 | 6/2013 | Lee | |
| 2013/0264298 A1 | 10/2013 | Shih et al. | |
| 2013/0314861 A1 | 11/2013 | Burford | |
| 2013/0327255 A1 | 12/2013 | Pajic | |
| 2014/0159441 A1 | 6/2014 | Philipzik et al. | |
| 2014/0175843 A1 | 6/2014 | Westerink et al. | |
| 2014/0175847 A1 | 6/2014 | Schurg | |
| 2014/0284972 A1 | 9/2014 | Rieder et al. | |
| 2014/0284973 A1 | 9/2014 | Wolgast et al. | |
| 2014/0300162 A1 * | 10/2014 | Udriste | B64D 11/06 |
| | | | 297/340 |
| 2014/0333100 A1 | 11/2014 | Wilkens | |

(56) References Cited

U.S. PATENT DOCUMENTS

| | | | |
|---|---|---|---|
| 2014/0375090 A1* | 12/2014 | Wegenka | B60N 2/242 297/188.09 |
| 2015/0091337 A1 | 4/2015 | Cailleteau et al. | |
| 2015/0091342 A1 | 4/2015 | Cailleteau et al. | |
| 2015/0108798 A1* | 4/2015 | Boyer, Jr. | B64D 11/0638 297/163 |
| 2015/0115668 A1 | 4/2015 | Martinak | |
| 2015/0166181 A1 | 6/2015 | Scott et al. | |
| 2015/0175265 A1 | 6/2015 | Thiele | |
| 2015/0227277 A1 | 8/2015 | Margis et al. | |
| 2015/0246645 A1 | 9/2015 | Procter et al. | |
| 2015/0274038 A1 | 10/2015 | Garing | |
| 2015/0284087 A1* | 10/2015 | Henshaw | B64D 11/064 297/318 |
| 2015/0284095 A1* | 10/2015 | Pozzi | B64D 11/0631 297/188.08 |
| 2015/0291073 A1 | 10/2015 | Pajic | |
| 2015/0321614 A1 | 11/2015 | Line et al. | |
| 2016/0009394 A1 | 1/2016 | Felske | |
| 2016/0009398 A1 | 1/2016 | Klettke | |
| 2016/0023618 A1 | 1/2016 | Pajic | |
| 2016/0023765 A1 | 1/2016 | Zheng et al. | |
| 2016/0023769 A1 | 1/2016 | Zheng et al. | |
| 2016/0031560 A1 | 2/2016 | Zheng et al. | |
| 2016/0039523 A1 | 2/2016 | Guttropf et al. | |
| 2016/0039524 A1 | 2/2016 | Zheng et al. | |
| 2016/0114891 A1 | 4/2016 | Pajic | |
| 2016/0152169 A1 | 6/2016 | Zheng et al. | |
| 2016/0272125 A1 | 9/2016 | Barnes | |
| 2016/0274674 A1 | 9/2016 | Valdes et al. | |
| 2016/0297533 A1 | 10/2016 | Le et al. | |

FOREIGN PATENT DOCUMENTS

| | | |
|---|---|---|
| DE | 100 42 495 | 3/2002 |
| DE | 101 18 496 | 10/2002 |
| DE | 102 15 058 C1 | 7/2003 |
| DE | 203 15 554 | 12/2003 |
| DE | 10 2004 047 609 | 5/2005 |
| DE | 10 2005 051 138 | 5/2007 |
| DE | 10 2007 046 130 | 4/2009 |
| DE | 20 2012 100 251 | 2/2012 |
| DE | 20 2012 105 089 | 1/2013 |
| DE | 20 2013 102 887 | 7/2013 |
| DE | 10 2012 112 942 | 6/2014 |
| DE | 10 2013 017 696 | 7/2014 |
| DE | 10 2013 020 439 | 6/2015 |
| DE | 10 2014 220 549 | 4/2016 |
| DE | 10 2014 222 672 | 5/2016 |
| DE | 10 2016 000 818 | 7/2016 |
| EP | 0 018 662 | 11/1980 |
| EP | 1 712 421 | 10/2006 |
| EP | 1708922 | 9/2009 |
| EP | 2 110 313 | 10/2009 |
| EP | 1 789 317 B1 | 4/2010 |
| EP | 2 569 187 | 3/2013 |
| EP | 2 602 149 | 6/2013 |
| EP | 2 620 321 | 7/2013 |
| EP | 2 639 102 | 9/2013 |
| EP | 2 639 103 | 9/2013 |
| EP | 2 483 150 | 1/2014 |
| EP | 2 726 373 | 5/2014 |
| EP | 2 746 158 | 6/2014 |
| EP | 2 759 447 | 7/2014 |
| EP | 2 799 338 | 11/2014 |
| EP | 2 877 398 | 6/2015 |
| EP | 2 917 105 | 9/2015 |
| EP | 2 981 464 | 2/2016 |
| EP | 3 063 036 | 9/2016 |
| FR | 2 577 776 | 8/1986 |
| FR | 2 923 780 | 5/2009 |
| FR | 2 982 218 | 5/2013 |
| FR | 3 024 090 | 1/2016 |
| GB | 2 438 090 | 11/2007 |
| JP | 5254747 | 8/2013 |
| JP | 5600150 | 10/2014 |
| JP | 5 702 190 | 4/2015 |
| WO | WO 95/09742 | 4/1995 |
| WO | WO 00/02745 | 1/2000 |
| WO | WO 02/32268 | 4/2002 |
| WO | WO 03/106261 | 12/2003 |
| WO | WO 2006/029659 | 3/2006 |
| WO | WO 2007/015832 | 5/2007 |
| WO | WO 2007/123615 | 11/2007 |
| WO | WO 2009/098381 | 8/2009 |
| WO | WO 2011/018930 | 2/2011 |
| WO | WO 2011/143648 | 11/2011 |
| WO | WO 2012/064922 | 5/2012 |
| WO | WO 2012/118096 | 9/2012 |
| WO | WO 2013/003537 | 1/2013 |
| WO | WO 2013/055671 | 4/2013 |
| WO | WO 2013/068316 | 5/2013 |
| WO | WO 2013/109751 | 7/2013 |
| WO | WO 2013/166067 | 11/2013 |
| WO | WO 2014/075040 | 5/2014 |
| WO | WO 2014/161583 | 10/2014 |
| WO | WO 2014/163579 | 10/2014 |
| WO | WO 2014/176017 | 10/2014 |
| WO | WO 2015/063082 | 5/2015 |
| WO | WO 2015/157309 | 10/2015 |
| WO | WO 2016/012693 | 1/2016 |
| WO | WO 2016/076921 | 5/2016 |
| WO | WO 2016/140631 | 9/2016 |
| WO | WO 2016/168200 | 10/2016 |
| WO | WO 2017/173400 | 10/2017 |

OTHER PUBLICATIONS

Invitation to Pay Additional Fees in co-pending International Patent Application No. PCT/US2016/027145, dated Jul. 22, 2016, in 10 pages.

International Search Report and Written Opinion in co-pending Patent Application No. PCT/US2016/027145, dated Sep. 12, 2016, in 21 pages.

International Search Report and Written Opinion in co-pending Patent Application No. PCT/US2017/025599, dated Sep. 4, 2017, in 17 pages.

* cited by examiner

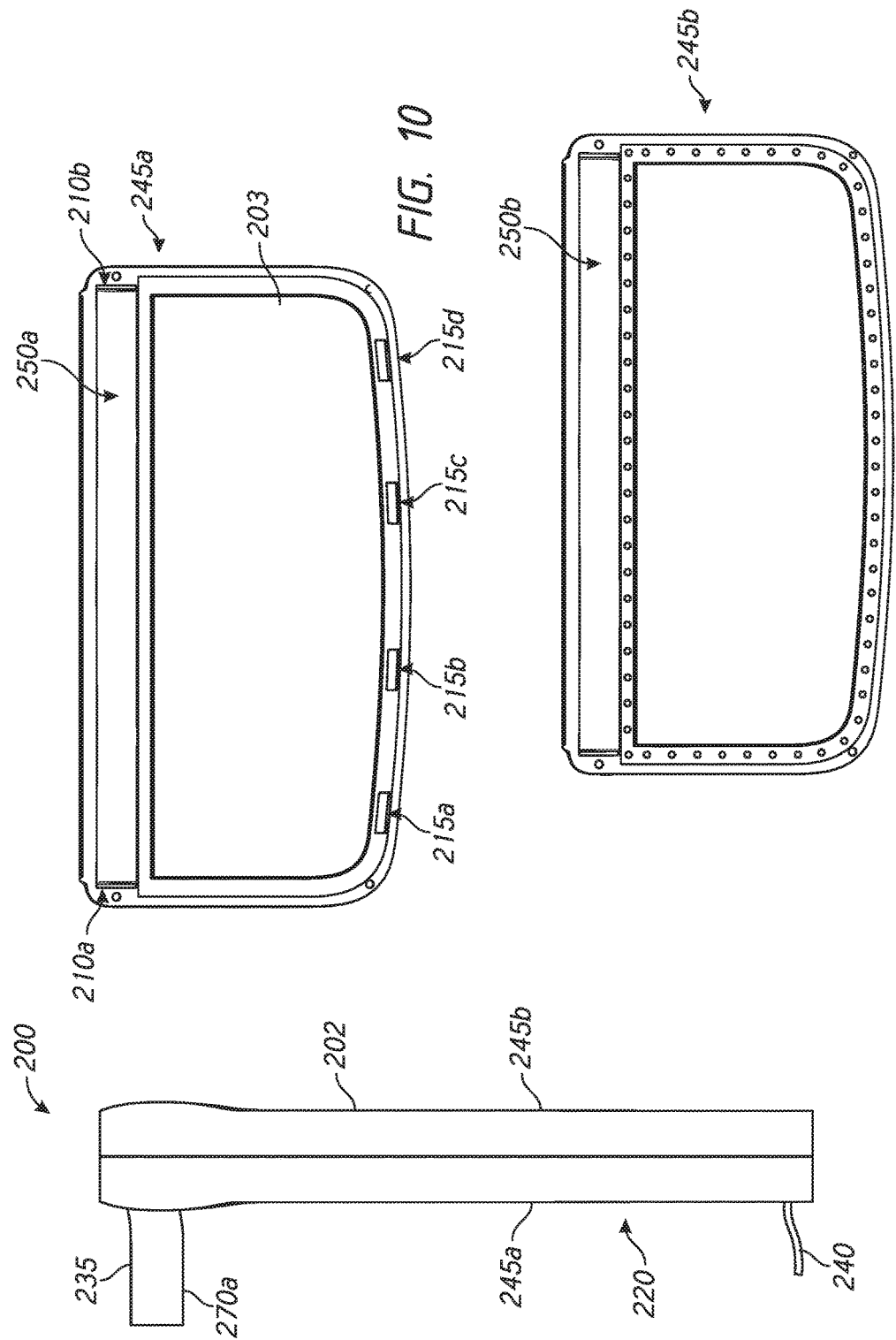

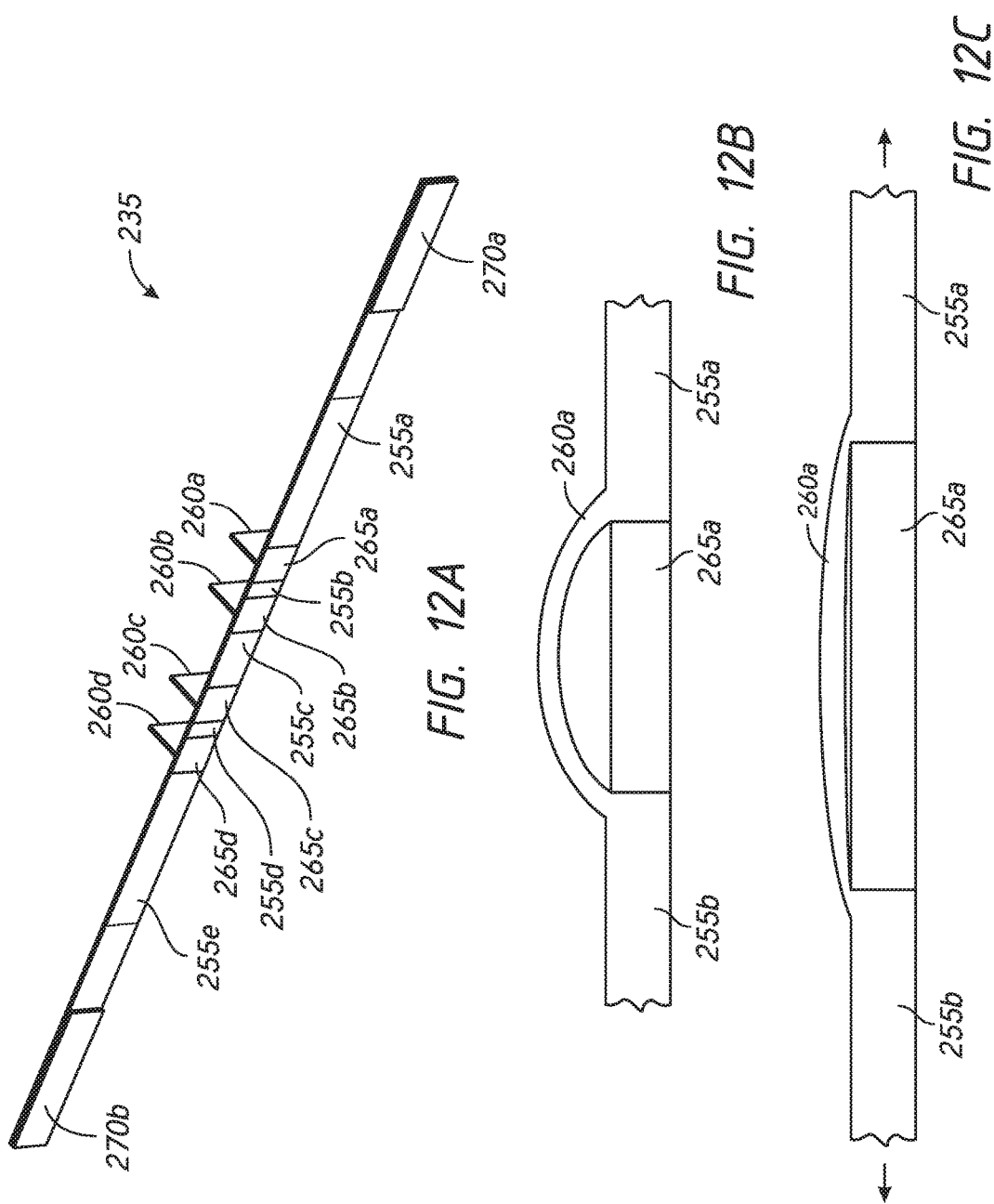

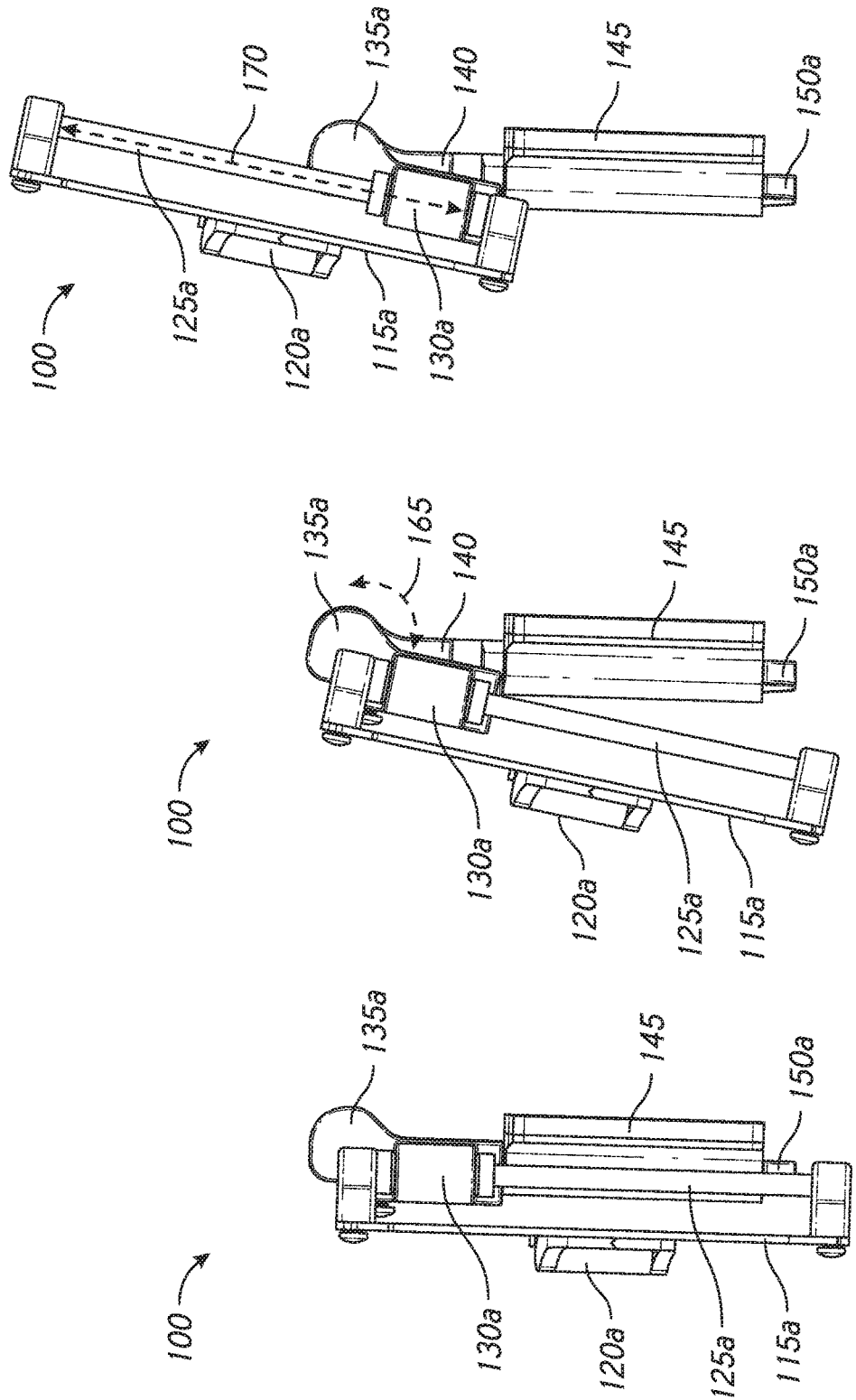

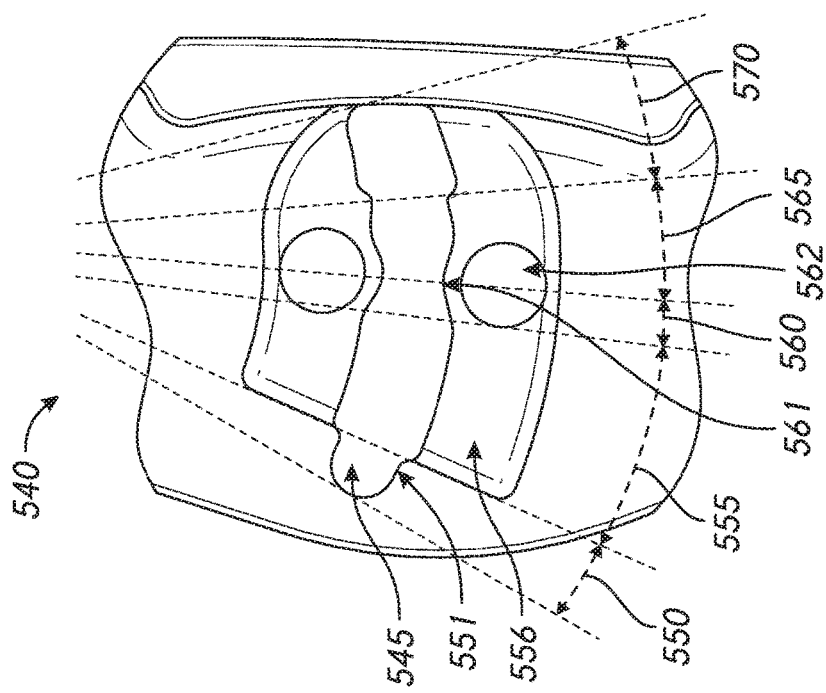
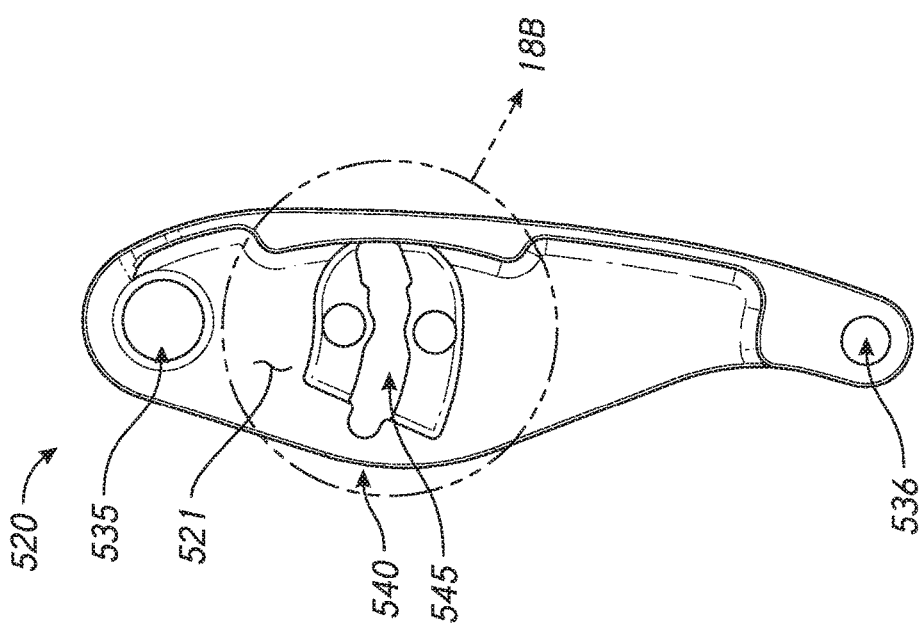

AIRCRAFT SEATING ASSEMBLY AND COMPONENTS

RELATED APPLICATIONS

This application claims priority to U.S. Provisional Application No. 62/317,374, filed on Apr. 1, 2016. The entire contents of the application identified above are incorporated by reference herein and made a part of this specification.

BACKGROUND

Field

The embodiments described herein relate generally to seat devices, systems, and methods. In particular, some embodiments described herein relate to aircraft seat devices, systems, and methods.

Background

The structure of aircraft seats plays a significant role in the airline industry. As passenger seating is typically arranged in rows with one or more aisles separating parts of each row, aircraft seating assemblies typically are configured as 2, 3 or 4 seat units. These aircraft seating assemblies have a structure for withstanding forces caused not only due to acceleration and deceleration of the aircraft during normal operation, but also substantial forces caused during emergencies. Significantly, the aircraft seats desirably achieve this performance while being relatively lightweight. Further, while the structural integrity and weight of the seating assemblies is important, the cost of the assemblies is also an important consideration.

SUMMARY

Embodiments of an aircraft seating assembly and/or components thereof are disclosed which are both compliant with industry regulations and lightweight yet capable of withstanding significant forces. In some embodiments, the aircraft seating assembly and/or components thereof can be installed in an aircraft.

In some embodiments, a seat assembly can include an adjustable headrest. The adjustable headrest can include a base. The adjustable headrest can include a mounting body coupled to the base. The mounting body can be removably coupled to the seat. The adjustable headrest can include one or more wing portions. The one or more wing portions can be rotatably coupled to lateral portions of the base.

In some embodiments, the seat assembly can include one or more rails coupled to the base. In some embodiments, the seat assembly can include one or more slides coupled to the mounting body. The one or more slides can be movably coupled to the one or more rails, such as via a slidable coupling. The base can be coupled to the mounting body via the one or more rails and one or more slides. In some embodiments, the slidable coupling of the one or more slides to the one or more rails can vertically adjust a position of the base. In some embodiments, the one or more rails can be oriented generally parallel to the base. In some embodiments, an axis of translation of the adjustable headrest pivots with the adjustable headrest. In some embodiments, the one or more slides can be rotatably coupled to the mounting body. In some embodiments, the rotatable coupling of the one or more slides to the mounting body can adjust a pitch of the base. In some embodiments, the axis of rotation of the rotatable coupling of the one or more slides to the mounting body is a horizontal axis in a plane generally parallel to the seat.

In some embodiments, an axis of rotation of the rotatable coupling between the one or more wing portions and the base is non-vertical. In some embodiments, an angle formed between the axis of rotation of the rotatable coupling between the one or more wing portions and the base is about 10 degrees.

In some embodiments, the mounting body comprises one or more prongs configured to removably couple with a housing of the seat. In some embodiments, the seat can include a seat back. The mounting body can be removably coupled to the seat back.

In some embodiments, a seat assembly can include a sleeve which can be attached to a surface of a seat of the seat assembly. The sleeve can include a frame. The sleeve can include a wall at least partially extending within the frame. The sleeve can include a first retention component coupled to the frame. The first retention component can include a fastener configured to removably couple to the surface. The retention component can expand from a first effective length to a second effective length.

In some embodiments, the first retention component can include one or more inelastic portions and one or more expandable portions. The one or more expandable portions can allow the first retention component to expand from the first effective length to the second effective length. In some embodiments, the first retention component can include at least two inelastic portions and at least one expandable portion positioned between the elastic portions. In some embodiments, the first retention component can include one or more restriction portions configured to inhibit expansion of the first retention component beyond the second effective length. In some embodiments, the one or more restriction portions can be formed from an inelastic material. In some embodiments, the one or more restriction portions can form part of the one or more inelastic portions.

In some embodiments, the fastener of the first retention component can be a hook-and-loop fastener. In some embodiments, the first retention component can be positioned at or proximate a top side of the sleeve. In some embodiments, the frame can include a channel within the frame. In some embodiments, at least a portion of the retention component can be positioned within the channel to couple the retention component to the frame.

In some embodiments, the sleeve can include a second retention component coupled to the frame. The second retention component can include a fastener which can removably couple to the surface. In some embodiments, the second retention component can be coupled at or proximate a bottom side of the frame. In some embodiments, the second retention component can allow the frame to pivot relative to the surface.

In some embodiments, the frame can be formed from a rigid material. In some embodiments, the wall can be formed from a rigid material. In some embodiments, the seat can include a seat back. The mounting body can be attached to the seat back.

In some embodiments, a seat assembly can include a spreader which can be attached to a connection assembly of the seat assembly. The spreader can include a body portion coupled to a first tube and a second tube of a connection assembly. The body portion comprises a recessed portion positioned along a bottom side of the spreader.

In some embodiments, an adjustable floor mount system can removably couple a seat to a floor. The floor mount can include one or more connection rails which can removably couple to a seat. The one or more connection rails can include a slidable portion which can move relative to other portions of the one or more connections rails. The floor mount can include one or more locking mechanisms. The one or more locking mechanisms can include a locked position which can lock the slidable portion relative to other portions of the one or more connection rails. The one or more locking mechanisms can include an unlocked position configured to allow the slidable portion to move relative to other portions of the one or more connection rails.

In some embodiments, the one or more locking mechanisms can include a biasing member which can bias the locking mechanisms towards the locked position. In some embodiments, the slidable portions can translate relative to other portions of the one or more connection rails.

In some embodiments, the adjustable floor mount system can include an indicator which can provide a user within an indication as to a specific parameter of a seat. In some embodiments, the parameter can be the pitch of the seat relative to a second seat positioned frontward of the seat.

In some embodiments, a seat assembly can include an adjustable headrest. The adjustable headrest can be attached to a seat of the seat assembly. The adjustable headrest can include a mounting assembly. The mounting assembly can be coupled to the seat. The mounting assembly can include a mounting body. The mounting assembly can include one or more slides. The one or more slides can be rotatably coupled to the mounting body such that the slides rotate about a first axis. The adjustable headrest can include a headrest assembly which can support the head of a passenger. The headrest assembly can include a base. The headrest assembly can include one or more rails coupled to the base. The one or more rails can be slidably received within the one or more slides of the mounting body to allow the headrest assembly to be translated along a second axis and rotated about the first axis. The second axis can rotate about the first axis when the headrest assembly is rotated about the first axis.

In some embodiments, the headrest assembly can include one or more wing portions. The one or more wing portions can be coupled to lateral portions of the base. In some embodiments, the one or more wing portions can be rotatably coupled to lateral portions of the base. In some embodiments, an axis of rotation of the coupling between the one or more wing portions and the base can be non-vertical. In some embodiments, an angle formed between the axis of rotation of the rotatable coupling between the one or more wing portions and the base can be about 10 degrees.

In some embodiments, the one or more rails can be oriented generally parallel to the base. In some embodiments, the first axis can be a horizontal axis in a plane generally parallel to the seat.

In some embodiments, the mounting body can include one or more prongs which can removably couple with a housing of the seat. In some embodiments, the seat can include a seat back. The mounting body can be attached to the seat back.

In some embodiments, a seat assembly can include an energy absorption system. The seat assembly can be mounted to an aircraft. The energy absorption system can include a mount having a surface. The energy absorption system can include a seat having a seat back. The seat back can have a surface which can be positioned adjacent the surface of the mount. The energy absorption system can include an energy absorbing structure on one of the seat back and the mount. The energy absorbing structure can control movement of the seat relative to the mount. The energy absorbing structure can include a first movement-restricting region. The energy absorption system can include an interacting member having a surface. The interacting member can extend at least between the seat back and the mount. In some embodiments, when the seat is between a first position and a second position relative to the mount, the surface of the interacting member can interface with a surface defining the first movement-restricting region. This can inhibit movement of the seat back until the seat back is subject to a force greater than a first threshold force.

In some embodiments, the energy absorbing structure can include a second movement-restricting region. In some embodiments, when the seat is between a third position and a fourth position relative to the mount, the surface of the interacting member is configured to interface with a surface defining the second movement-restricting region. This can to inhibit movement of the seat back until the seat back is subject to a force greater than a second threshold force.

In some embodiments, at least one of the first movement-restricting region and the second movement-restricting region can include a detent. In some embodiments, the second movement-restricting region can include the detent. In some embodiments, the detent can deform to allow the interacting member to pass therethrough when subject to a force which exceeds the second threshold force. In some embodiments, the energy absorbing zone can include one or more cutouts proximate the detent to facilitate deformation of the detent.

In some embodiments, at least one of the first threshold force and the second threshold force can be primarily a frictional force between interfacing surfaces of the seat back, the mount, and the interacting member. In some embodiments, the first threshold force can be primarily the frictional force between interfacing surfaces of the seat back, the mount, and the interacting member.

In some embodiments, the energy absorbing structure can include a first free-movement region. In some embodiments, when the seat is between the second position and a third position relative to the mount, the seat back can be allowed to freely move relative to the mount. In some embodiments, the first free-movement region can include a recessed surface of the mount.

In some embodiments, the energy absorbing structure can include a third movement-restricting region. In some embodiments, when the seat is between the fourth position and a fifth position relative to the mount, the surface of the interacting member can interface with a surface defining the third movement-restricting region. This can inhibit movement of the seat back until the seat back is subject to a force greater than a third threshold force. In some embodiments, at least one of the first threshold force, the second threshold force, and the third threshold force can progressively increase across the extent of the corresponding movement-restricting region. In some embodiments, the third threshold force can progressively increase across the extent of the corresponding movement-restricting region.

In some embodiments, the energy absorbing structure can include a second free-movement region. In some embodiments, when the seat is between a fifth position and a sixth position relative to the mount, the seat back can be allowed to freely move relative to the mount.

In some embodiments, the first threshold force can be greater than 25 $lb_f$. In some embodiments, the first threshold force can be greater than 35 $lb_f$. In some embodiments, the first threshold force can be greater than 45 $lb_f$. In some embodiments, the first threshold force can be greater than 10 g-forces. In some embodiments, the first threshold force can be greater than 12 g-forces. In some embodiments, the first threshold force can be greater than 14 g-forces. In some embodiments, the first threshold force can be greater than 16 g-forces.

In some embodiments, the second threshold force can be greater than 75 $lb_f$. In some embodiments, the second threshold force can be greater than 100 $lb_f$. In some embodiments, the second threshold force can be greater than 125 $lb_f$. In some embodiments, the second threshold force can be greater than 30 g-forces. In some embodiments, the second threshold force can be greater than 35 g-forces. In some embodiments, the second threshold force can be greater than 40 g-forces. In some embodiments, the second threshold force can be greater than 45 g-forces.

In some embodiments, the seat back can be rotatably coupled to the mount. In some embodiments, the seat back can be rotatably coupled to the mount at a first mounting location and coupled to the mount at a second mounting location. The second mounting location can form part of the energy absorbing structure. In some embodiments, the second mounting location can form part of the first movement-restricting region.

In some embodiments, the seat back can include a movable wall positioned below a pivot axis between the seat back and the mount. The movable wall can move forwardly relative to the seat back when subject to a forwardly directed force. In some embodiments, the movable wall can pivot relative to the seat back when subject to a forwardly directed force.

In some embodiments, the mount can include a slot through which the interacting member is positioned. The slot can form at least part of the energy absorbing structure. In some embodiments, the slot can have a radius of curvature which originates at or proximate a pivot axis between the seat back and the mount. This can allow the fastener to move along the slot when the seat is pivoted relative to the mount.

BRIEF DESCRIPTION OF THE DRAWINGS

Embodiments of the present disclosure will now be described hereinafter, by way of example only, with reference to the accompanying drawings as indicated below.

FIG. 9 illustrates a side view of the storage sleeve of FIG. 6.

FIG. 10 illustrates a rear view of a component of the storage sleeve of FIG. 6.

FIG. 11 illustrates a front view of a component of the storage sleeve of FIG. 6.

FIG. 12A illustrates a perspective view of an embodiment of a retention component of the storage sleeve of FIG. 6.

FIG. 12B illustrates a top, schematic view of a portion of the retention component of FIG. 12A in a first configuration.

FIG. 12C illustrates a top, schematic view of a portion of the retention component of FIG. 12A in a second configuration.

FIG. 16A-C illustrate views of the headrest of FIG. 1 in various configurations.

FIG. 18A illustrates a front view of the bracket of FIG. 17.

FIG. 18B illustrates a zoomed-in view of the bracket of FIG. 18A.

DETAILED DESCRIPTION

Figure 2:
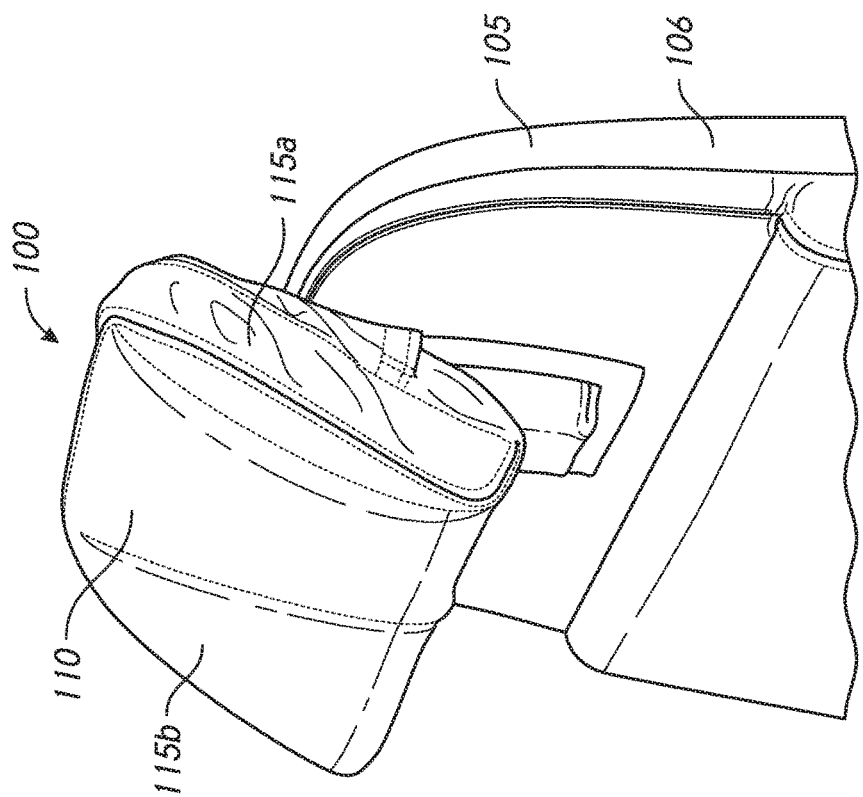
FIG. 2 illustrates a perspective view of the headrest of FIG. 1 in a second configuration.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "left side," and "right side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The components described herein can be used with seats of an aircraft seating assembly, including but not limited to aircraft seating assemblies described in U.S. Publication Nos. 2014/0333100 and 2016/0297533, the entirety of each of which is incorporated by reference herein. While the components are described in connection with aircraft seats, the components described herein can be used in connection with other types of seats, including seats for automotive applications, or devices other than seats.

Adjustable Headrest

Figure 1:
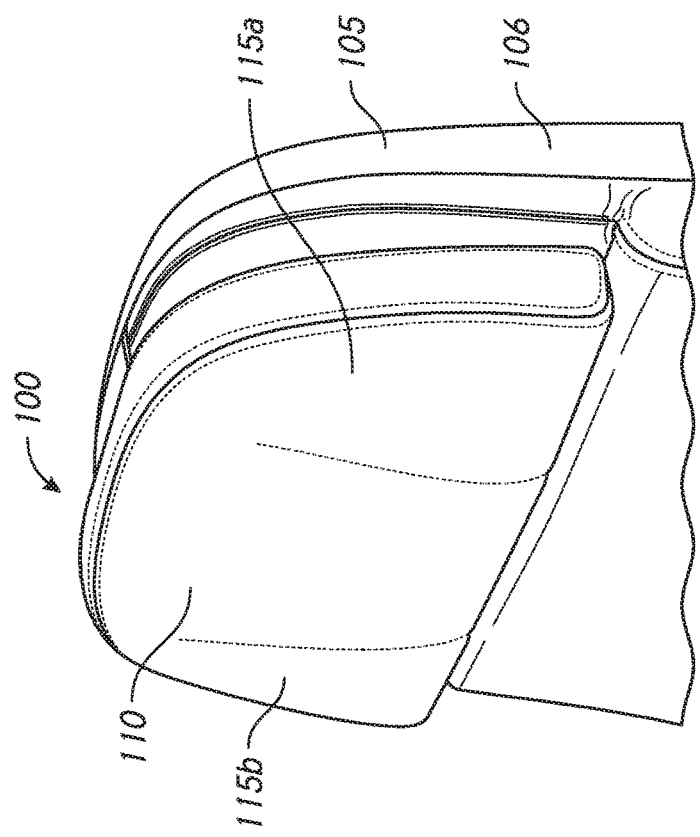
FIG. 1 illustrates a perspective view of an embodiment of a headrest in a first configuration.

FIGS. 1-5 and 16A-C illustrate an embodiment of an adjustable headrest 100 of an aircraft seating assembly which can include one or more seats 105. With reference first to FIGS. 1 and 2, in some embodiments the headrest 100 can be adjustable in one or more dimensions. This can beneficially enhance passenger comfort when utilizing the headrest 100 by allowing the passenger to adjust the headrest 100 into a position more suitable for the passenger's build. As shown in the illustrated embodiment, the headrest 100 can be attached to a seat 105 of the aircraft seating assembly. The seating assembly 101 can include a seat pan (not shown) upon which a passenger can sit and a seat back 106 which can support the passenger's back. The headrest 100 can include a base 110 and one or more wings 115a, 115b. As shown in the illustrated embodiment, the wings 115a, 115b can be attached to lateral portions of the base 110; however, it is to be understood that the wings 115a, 115b can be attached to other portions of the base 110 such as the top and/or bottom portions. Although two wings 115a, 115b are shown, the headrest 100 can include a fewer or greater number of wings. For example, the headrest 100 can include two, three, four, or more wings on each lateral side of the headrest 100. In some embodiments, each of the wings can be attached directly to the base 110. In other embodiments, one or more wings can be attached to other wings which are directly attached to the base 110. In some embodiments, the headrest 100 can have an upholstery covering over the base 110 and wings 115a, 115b as well as other components of the headrest 100.

As shown in FIGS. 1 and 2, in some embodiments, the headrest 100 can be translatably adjusted. For example, the headrest 100 can be translated in a generally vertical direction relative to the seat 105. This can beneficially account for varying heights of a passenger. In some embodiments, the headrest 100 can be rotatably adjusted. For example, the pitch of the headrest 100 can be adjusted (i.e., rotational adjustment along a horizontal axis in a plane generally parallel to the seat back 106 of the seat 105). This can beneficially account for a passenger's preferred head position. In some embodiments, one or more components of the headrest 100 can also be translated and/or rotated relative to each other. For example, wings 115a, 115b can be translated and/or rotated relative to a base 110. This can beneficially provide lateral support for a passenger's head.

Figure 3:
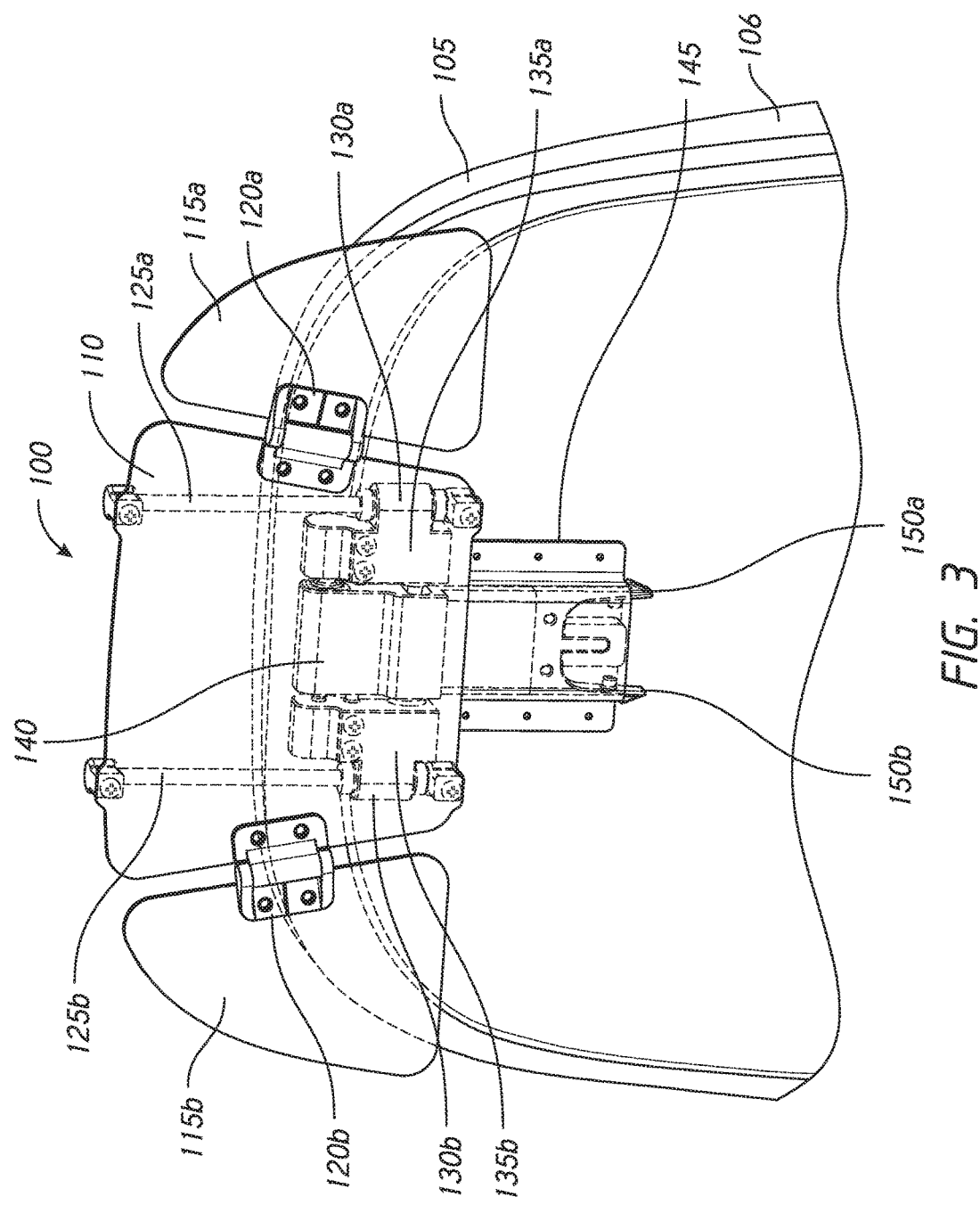
FIG. 3 illustrates a front, perspective view of components of the headrest of FIG. 1.
Figure 4:
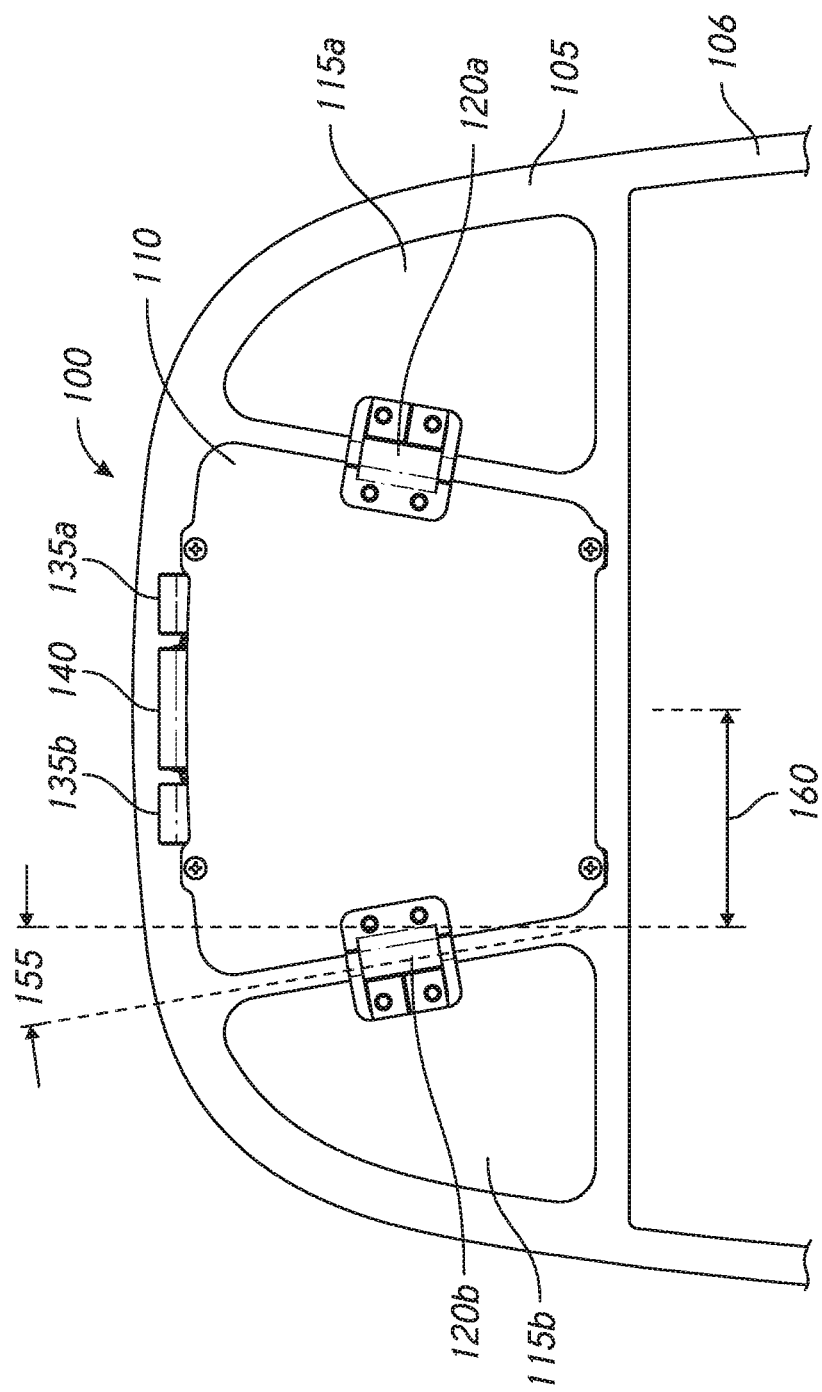
FIG. 4 illustrates a front view of components of the headrest of FIG. 1.
Figure 5:
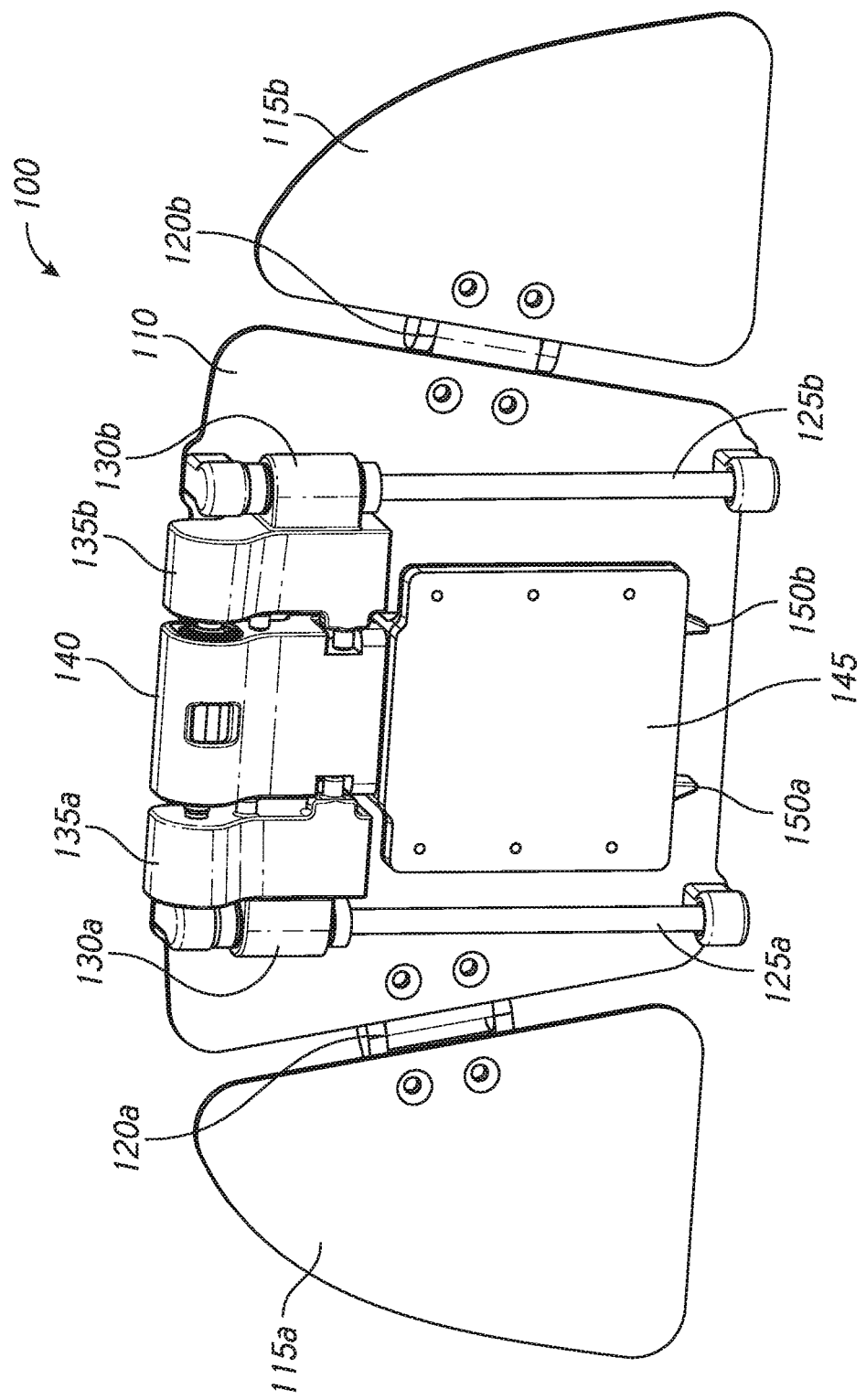
FIG. 5 illustrates a rear, perspective view of components of the headrest of FIG. 1.

With reference next to FIGS. 3-5 which illustrate underlying components of the headrest 100, one or both wings 115a, 115b can be rotatably coupled to the base 110 via a rotatably coupling, such as hinges 120a, 120b with a single degree of rotational freedom. Other types of mechanical couplings can be used such as those which provide additional rotational degrees of freedom, such as ball joints, and/or those which provide one or more translational degrees of freedom. In some embodiments, one or both wings 115a, 115b can be unitarily formed with base 110 and connected via a living hinge. In some embodiments, the couplings, such as hinges 120a, 120b can provide some degree of frictional engagement to maintain the wings 115a, 115b in position relative to the base 110. This can beneficially retain a configuration desired by the passenger.

As shown in the illustrated embodiment, the base 110 can include one or more rods or rails 125a, 125b. The rails 125a, 125b can slidably engage one or more corresponding slides 130a, 130b. The slides 130a, 130b can be maintained in position on the rails 125a, 125b via an engagement mechanism such as, but not limited to, friction, detents, clips, and the like. Sliding engagement between the slides 130a, 130b on the rails 125a, 125b can allow the base 110 and/or the headrest 100 to translate relative to the slides 130a, 130b. For example, as shown in the illustrated embodiment, the rails 125a, 125b and slides 130a, 130b can allow the base 110 and/or the headrest 100 to translate in a generally vertical direction. In some embodiments, the rails 125a, 125b and slides 130a, 130b can be oriented to provide translation in other directions. In some embodiments, additional rails, slides, or other translatable couplings can be used to provide additional translational degrees of freedom. Moreover, other types of mechanical couplings can be used such as those which provide additional rotational degrees of freedom, such as ball joints, and/or those which provide one or more translational degrees of freedom.

As shown in the illustrated embodiment, one or both slides 130a, 130b can be coupled to one or more units 135a, 135b. As shown, the slides 130a, 130b are integrally formed with the bodies; however, it is to be understood that the slides 130a, 130b can be separate units which are fastened to units 135a, 135b via mechanical fasteners, such as screws, bolts, clips, chemical fasteners such as adhesives, fastening techniques such as welding, any other fastener or technique as desired, and/or a combination of such fasteners and/or techniques. The units 135a, 135b can be rotatably coupled to a mounting body 140 which can provide one or more rotational degrees of freedom. As shown, the coupling between the units 135a, 135b and the mounting body 140 can provide a single degree of rotational freedom, such as a pin coupling. For example, the coupling can allow pitch adjustment of the base 110 and/or the headrest 100. Other types of mechanical couplings can be used such as those which provide additional rotational degrees of freedom, such as ball joints, and/or those which provide one or more translational degrees of freedom.

With reference to FIGS. 3 and 5, the mounting body 140 can be coupled to the seat 105, such as the seat back 106, via a coupling assembly. As shown, the coupling assembly can include a housing 145 attached to the seat 105 and fasteners, such as a prongs 150a, 150b, attached to the mounting body 140. The prongs 150a, 150b can be inserted into an opening and engage sides of the housing 145. This snap-fit coupling assembly can advantageously facilitate attachment and removal of the headrest 100 from the seat 105. For example, to remove the headrest 100 from the seat 105, the prongs 150a, 150b can be bent inwardly by the fingers of a flight attendant or maintenance work so that the ends of the prongs 150a, 150b do not engage sides of the housing 145. Other types of coupling mechanisms can also be used including, but not limited to, mechanical fasteners, such as screws, bolts, clips, chemical fasteners such as adhesives, fastening techniques such as welding, any other fastener or technique as desired, and/or a combination of such fasteners and/or techniques.

With reference to FIG. 4, in some embodiments, the angle 155 formed between the axes of rotation of one or both wings 115a, 115b and a vertical axis can be between about 0 degrees (i.e., vertical) to about 45 degrees, between about 5 degrees to about 20 degrees, between about 10 degrees to about 15 degrees, any sub-range within these ranges, and/or any other angle as desired. In some embodiments, the angle 155 can be about 10 degrees which can beneficially provide lateral support for a typical passenger when rotated outwards to support a passenger's head. In some embodiments, the distance 160 between the centerline of the headrest 100 and the axes of rotation of one or both wings 115a, 115b can be between about 2 inches to about 6 inches, between about 2.5 inches to about 5 inches, between about 3 inches to about 4 inches, any sub-range within these ranges, and/or any other distance as desired. In some embodiments, the distance 160 can be about 3 inches which can beneficially provide lateral support for a typical passenger when rotated outwards to support a passenger's head.

With reference next to FIGS. 16A-C, the adjustability of the base 110 of the headrest 100 is illustrated in further detail. FIG. 16a illustrates the headrest 100 in an initial configuration. FIG. 16B illustrates the headrest 100 in a rotated configuration. As shown in FIG. 16B, the base 110 can be rotated relative to the housing 145 which can be attached to the seat (not shown). In this manner, the base 110 can be rotated relative to the seat. The base 110 can be rotated via components of the headrest 100, such as unit 135a, which are rotatably coupled to mounting body 140. This rotation is represented by arrow 165. FIG. 16C illustrates the headrest 100 in a rotated and translated configuration. As shown in FIG. 16C, the base 110 can be translated relative to a housing 145 attached to the seat. In this manner, the base 110 can be translated relative to the seat. The axis of translation, represented by arrow 170, can rotate when the base 110 is rotated relative to the housing 145.

Storage Sleeve

Figure 6:
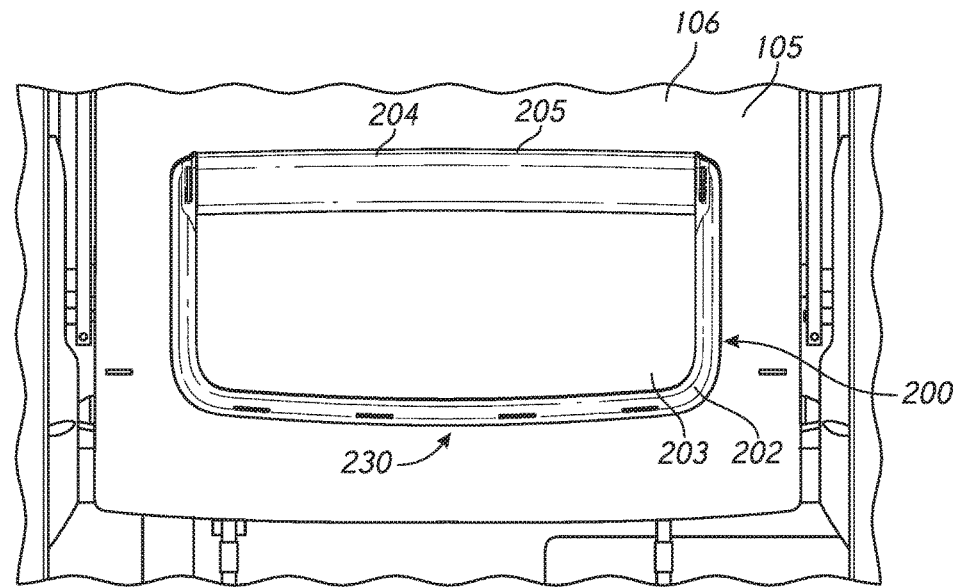
FIG. 6 illustrates a rear view of an embodiment of a storage sleeve attached to a seat.

FIGS. 6-12C illustrate an embodiment of a storage sleeve 200. With reference first to FIG. 6, in some embodiments, the storage sleeve 200 can be attached to a seat 105, such as a seat back. For example, the storage sleeve 200 can be attached to a rear side and/or a lower portion of a seat 105. In some embodiments, when the storage sleeve 200 is attached to a seat 105, a pocket can be formed between the seat 105 and the storage sleeve 200. This can advantageously be used for storage of items, such as passenger's belongings, travel literature, and the like. In some embodiments, the storage sleeve 200 can be pulled away from the seat 105 from the top side 205 thereby providing a passenger with access to the pocket formed between the storage sleeve 200 and the seat 105. The storage sleeve 200 can be shaped to fit contours of the seat 105 to which it is attached.

As shown in the illustrated embodiment, the storage sleeve 200 can include a frame 202 extending around at least a portion, or the entirety, of the periphery of the storage sleeve 200. The frame 202 can be at least partially, or entirely, hollow. This can beneficially allow components, such as retention components, to at least partially be retained within the frame 202. The storage sleeve 200 can include a wall 203 which can extend within at least a portion, or the entirety, of the area between the frame 202. The storage sleeve 200 can include a handle portion 204. In some embodiments, the handle portion 204 can include a portion of the frame 202 as well as a material wrap, such as but not limited to leather or fabric. As will be described in further detail below, the handle portion 204 can be used to move the storage sleeve 200 relative to the seat 105. Accordingly, use of a material wrap such as leather or fabric can provide a more comfortable gripping surface for a passenger utilizing the storage sleeve 200. A portion of the frame 202 can be offset at or around the top side 205 to allow the material wrap to be generally flush with the frame 202.

In some embodiments, the wall 203 can be formed from a similar material to the frame 202. For example, the wall 203 and the frame 202 can be formed from metals and/or hard plastics. The material can be relatively rigid such that the wall 203 and/or the frame 202 generally maintain their shape even when subjected to forces applied by items stored between the storage sleeve 200 and the seat 105. In some embodiments, the wall 203 can be formed from a different material from the frame 202. For example, the wall 203 can be formed from a more compliant material than the frame 202. This can beneficially allow the wall 203 to deform slightly and conform to the shape of items stored between the storage sleeve 200 and the seat 105. In some embodiments, the wall 203 can be formed from compliant materials such as textiles, leather, soft plastics, and the like. The frame 202 and/or wall 203 can be formed from any desired materials such as, but not limited to, plastics, metals, composites, and/or combinations of such materials. In some embodiments, the wall 203 can be a mesh or netting. The mesh or netting can be concealed via use of covering, such as a thin plate of material.

Figure 7:
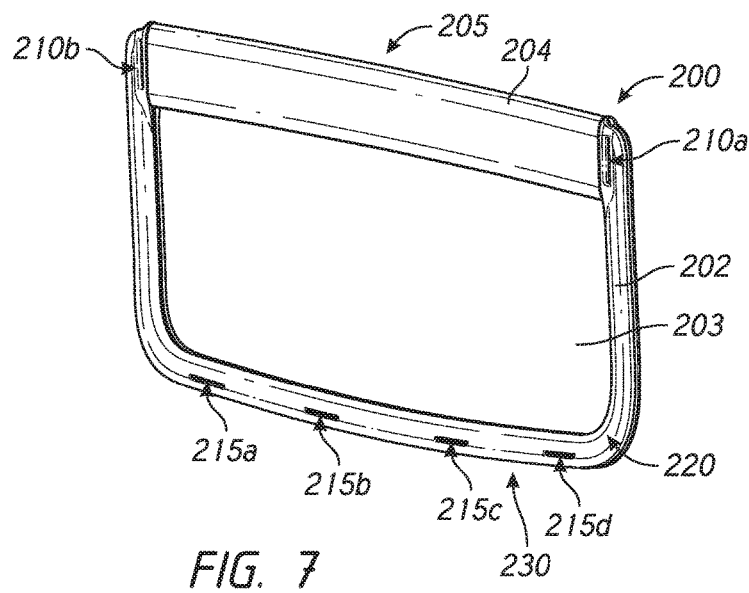
FIG. 7 illustrates a front perspective view of the storage sleeve of FIG. 6.
Figure 8:
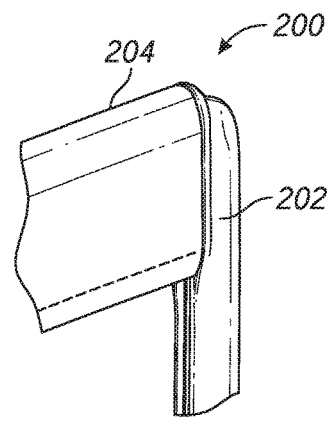
FIG. 8 illustrates a close-up, rear perspective view of the storage sleeve of FIG. 6.

With reference next to FIGS. 7-9, the storage sleeve 200 can include one or more apertures, such as apertures 210a-b, 215a-d, along a front face 220 of the storage sleeve 200. One or more of apertures 210a-b, 215a-d can be used to couple the front face 220 of the storage sleeve 200 to the seat 105. For example, retention components, such as but not limited to hook-and-loop fasteners, can include portions or ends which extend within the sleeve 200 and are coupled within the sleeve 200. The retention components can have ends which extend outwardly of the apertures 210a-b, 215a-d for attachment to a corresponding fastening mechanism on the seat 105.

In some embodiments, one or more retention components 235 extending from apertures 210a-b can allow the storage sleeve 200 to be pulled away from a rear of the seat 105. For example, the one or more retention components 235 extending from apertures 210a-b can include an elastic material which allows for the storage sleeve 200 to be pulled away from the rear of the seat 105 while applying a biasing force towards on the storage sleeve 200 towards the seat 105. In this manner, when the storage sleeve 200 is released, the storage sleeve 200 can be directed back towards the seat 105 to secure items stored between the storage sleeve 200 and the seat 105. In some embodiments, the storage sleeve 200 can be pulled away from a rear of the seat 105 a sufficient distance to allow storage of standard beverage bottles and like-sized materials.

In some embodiments, one or more retention components 240 extending from apertures 215a-d can generally serve as a virtual living hinge thereby allowing the storage sleeve 200 to pivot along the bottom side 230 of the storage sleeve 200. For example, the one or more retention components 240 extending from apertures 215a-d can allow sufficient movement of the bottom side 230 of the storage sleeve 200 to allow the storage sleeve 200 to pivot along the bottom side 230.

With reference next to FIGS. 9-11, the frame 202 of the storage sleeve 200 can be formed from one or more components. For example, as shown, the frame 202 can include a front portion 245a and a rear portion 245b. The front portion 245a can include a portion of frame 202, apertures 210a-b, 215a-d and/or the wall 203. The front portion 245a can include a channel 250a which can be utilized for a retention component 235, such as a partially or entirely elastic band, described in further detail below. The rear portion 245b can include a portion of frame 202. The rear portion 245b can include a channel 250b which can provide additional space for a retention component 235. In some embodiments, the rear portion 245b can be removed to service one or more retention components 235, 240 and/or other components of the storage sleeve 200. The rear portion 245b can be replaced to cover the internal components of the storage sleeve 200 and reduce the likelihood of tampering by a passenger. In some embodiments, at least a portion of the retention component 235 can be positioned between the front portion 245a and the rear portion 245b With reference next to FIGS. 12A-C, the storage sleeve 200 can include a retention component 235 which is at least partially expandable. As shown in the illustrated embodiment, the retention component 235 can include generally inelastic portions 255a, 255b, 255c, 255d, 255e with one or more expandable portions 265a-d which can be positioned between inelastic portions 255a, 255b, 255c, 255d, 255e. The expandable portions 265a-d can allow the retention component to expand from a first effective length between ends of the retention component 235 to a second effective length between ends of the retention component 235. In some embodiments, the expandable portion 265a-d can apply a biasing force which tends to transition the retention component 235 towards the first effective length. The expandable portion 265a-d can be formed from a generally elastic material. The expandable portion 265a-d can be formed from other types of materials such as metals and can be a spring, such as but not limited to a coil spring, a torsion spring, or a spiral spring. The expandability and/or biasing force of the retention component 235 can be modified by altering the number of expandable portions, the elasticity of the material and/or spring coefficient, and/or the length of the expandable portions.

In some embodiments, the retention component 235 can include one or more restriction portions 260a-d. The restriction portions 260a-d can resist or inhibit further expansion beyond a desired effective length. The restriction portions 260a-d can be attached to at least one of the inelastic portions 255a, 255b, 255c, 255d, 255e and the expandable portions 265a-d. For example, the restriction portions 260a-d can form part of the inelastic portions 255a, 255b, 255c, 255d, 255e as shown in FIGS. 12B and 12C. The restriction portions 260a-d can be separate components from the inelastic portions 255a, 255b, 255c, 255d, 255e and can be attached to the In some embodiments, one or more of the restriction portions 260a-d can be formed from an inelastic material collapsed or bundled together. The one or more portions 260a-d can be maintained in this collapsed configuration via one or more expandable portions 265a-d. The retention component 235 can include fastening mechanisms 270a-b, such as a hook-and-loop fastener, at its ends which can be used to attach the retention component 235 to the seat 105.

In some embodiments, during operation, as the retention component 235 is stretched due to pulling of the storage sleeve 200 away from the seat 105, the expandable portions 265a-d are stretched and the restriction portions 260a-d are straightened as shown in FIG. 12C. In some embodiments, when the restriction portions 260a-d are fully straightened, the retention component 235 will generally not stretch further due to generally inelasticity of the portions 255a, 255b, 255c, 255d, 255e and restriction portions 260a-d. This can define a generally fully extended position of the storage sleeve 200. When the storage sleeve 200 is released, the expandable portions 265a-d can apply a biasing force back towards the initial state as shown in FIG. 12B, thereby reducing the length between both ends of the retention component 235 and causing the storage sleeve 200 to move towards the seat 105. The restriction portions 260a-d can also transition back to a collapsed or bundled configuration due to this reducing in length between ends of the retention component 235. The length of a generally fully expanded retention component 235 can be modified by altering the number of restriction portions, the elasticity of the material and/or spring coefficient, and/or the length of the restriction portions. In some embodiments, the generally fully extended position can be sufficient to fit standard beverage bottles and the like.

Spreader

Figure 13:
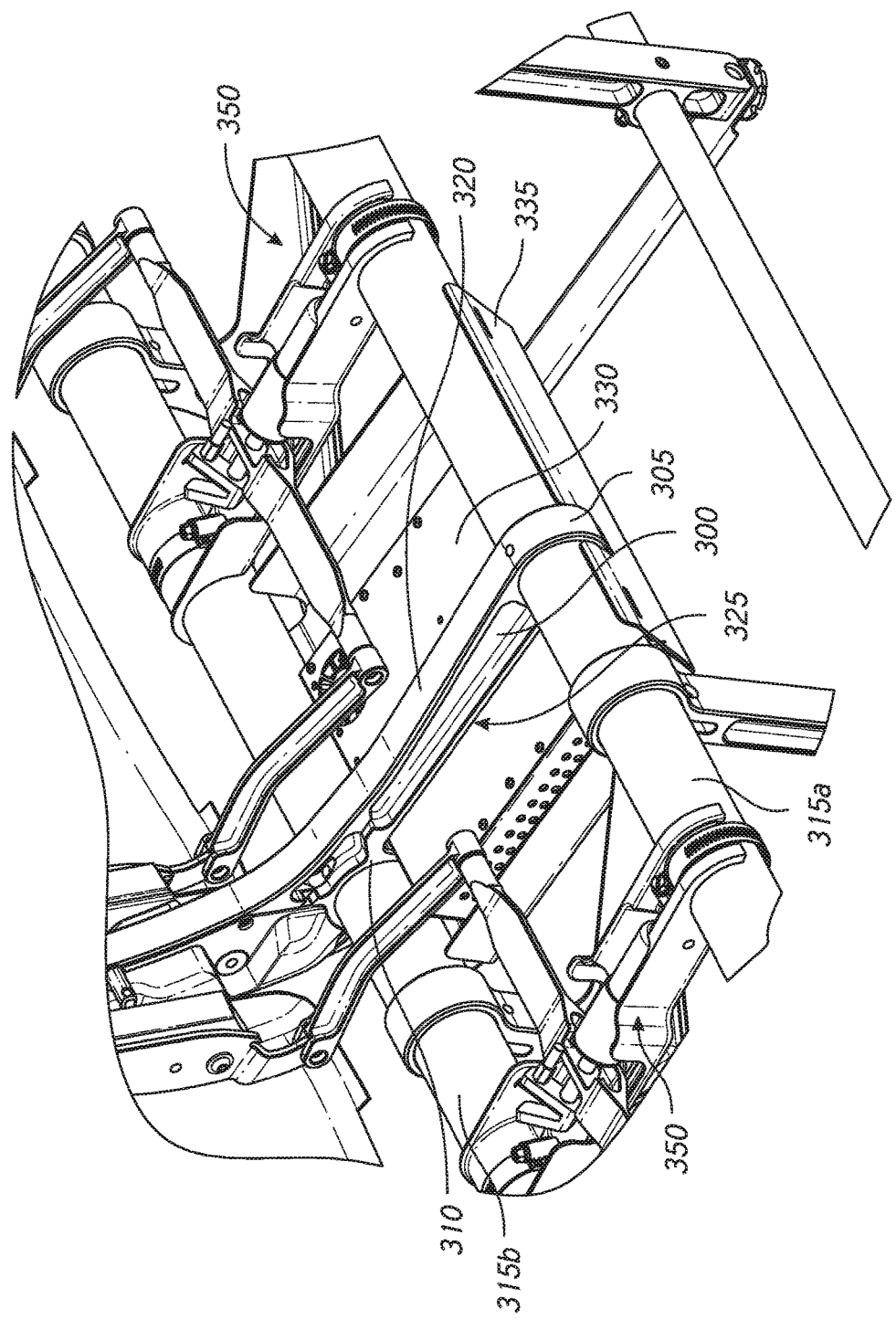
FIG. 13 illustrates a perspective view of an embodiment of a spreader.

With reference to FIG. 13, an embodiment of a spreader 300 is illustrated, the spreader 300 can be a structural member positioned between seats of a seating assembly. The spreader 300 can include a first end 305 coupled to a tube, such as fore tube 315a, of a connection assembly of an aircraft seating assembly. The connection assembly can include structures which couple the seat and spreaders to the deck of the aircraft. A portion 310 of the spreader 300 can be attached to a tube, such as aft tube 315b, of a connection assembly of an aircraft seating assembly. As shown in the illustrated embodiment, a body portion 320 of the spreader 300 can include a recessed area 325, such as along a bottom side of the spreader 300. This can advantageously allow for mounting of other components, such as an electronic box 330, higher up beneath the seat to maintain storage space beneath the seat. For example, as shown in the illustrated embodiment, the electronic box 330 can be mounted parallel to the seat rather than to a side of the seat which can reduce the width of storage space beneath the seat. The electronic box 330 can be retained within a carrier 335.

As shown in the illustrated embodiment, the electronic box 330 and carrier 335 can be used with a centrally located actuators 350 such as those described in U.S. application Ser. No. 15/089,366 entitled "AIRCRAFT SEATING ASSEMBLY", filed on Apr. 1, 2016, and U.S. Application Nos. 62/146,925 and 62/146,932, both filed on Apr. 13, 2015, the entirety of each of which is incorporated by reference herein.

Floor Mount System

Figure 15:
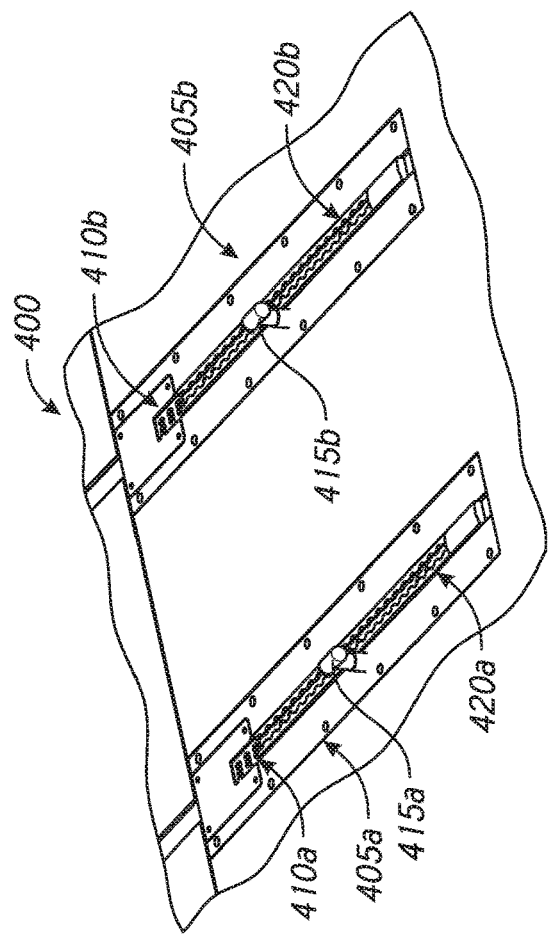
FIG. 15 illustrates a perspective view of the floor mount of FIG. 14.
Figure 14:
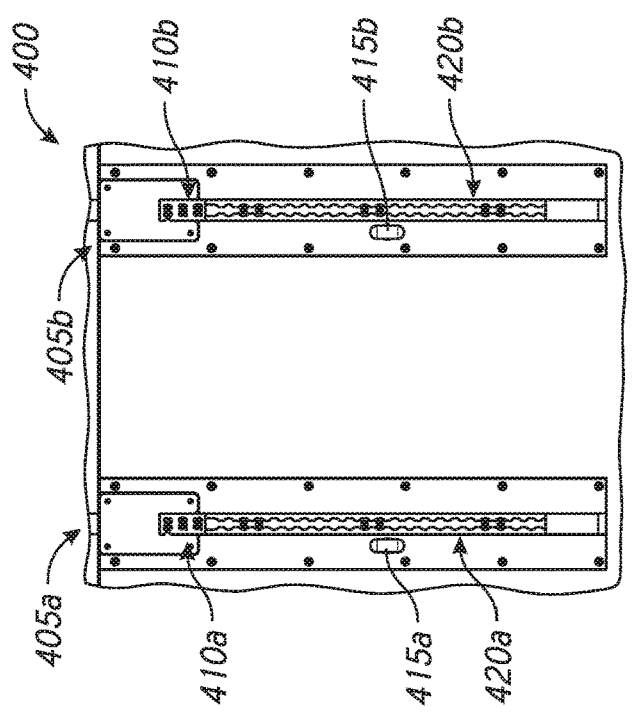
FIG. 14 illustrates a top plan view of an embodiment of a floor mount.

With reference to FIGS. 14 and 15, an embodiment of a floor mount system 400 is illustrated. The floor mount system 400 can be used to attach an aircraft seating assembly to a floor, such as the floor of an aircraft or a showroom floor. In some embodiments, the floor mount system 400 can be adjustable and allow for an adjustment of seat pitch relative to other seats in a separate row of seats. This can beneficially allow a user to make quick changes to seat pitch without having to wholly detach the seat from the floor mount. For example, a second row of seats can be mounted frontwards or rearwards of the seat mounted on the floor mount system 400.

As shown in the illustrated embodiment, the floor mount system 400 can include one or more connection rails 405a, 405b. The connection rails 405a, 405b can allow a seated mounted thereon to be translated relative to the connection rails 405a, 405b. The connection rails 405a, 405b can include one or more indicators 410a, 410b which can provide a user with an indication as to a specific parameter of the seat, such as the seat's pitch. In some embodiments, the connection rails 405a, 405b can include one or more locking mechanisms 415a, 415b. Actuation of these one or more locking mechanisms 415a, 415b from a locked position to an unlocked position can unlock the movement mechanism thereby allowing the seat to be moved. In some embodiments, portions 420a, 420b of the connection rails 405a, 405b can slide relative to other portions of the connection rails 405a, 405b. In some embodiments, the one or more locking mechanisms 415a, 415b can be biased into a locked position.

Energy Absorption Assemblies or Systems

FIGS. 17-19F illustrate an embodiment of a seat having a seat back 500 and an energy absorption assembly or system. The energy absorption assembly or system can assist in reducing injuries and traumas to passengers in the event of a high deceleration event. In some implementations, the energy absorption assembly or system can control movement of the seat back 500 to reduce impact forces on passengers during a high deceleration event. For example, a passenger seated behind the seat back 500 (hereinafter "rear-seated passenger") may contact the rear of the seat back 500 with the rear-seated passenger's head during a high deceleration event. The energy absorption system can allow the seat back 500 to cushion the rear-seated passenger's head in such circumstances.

Figure 17:
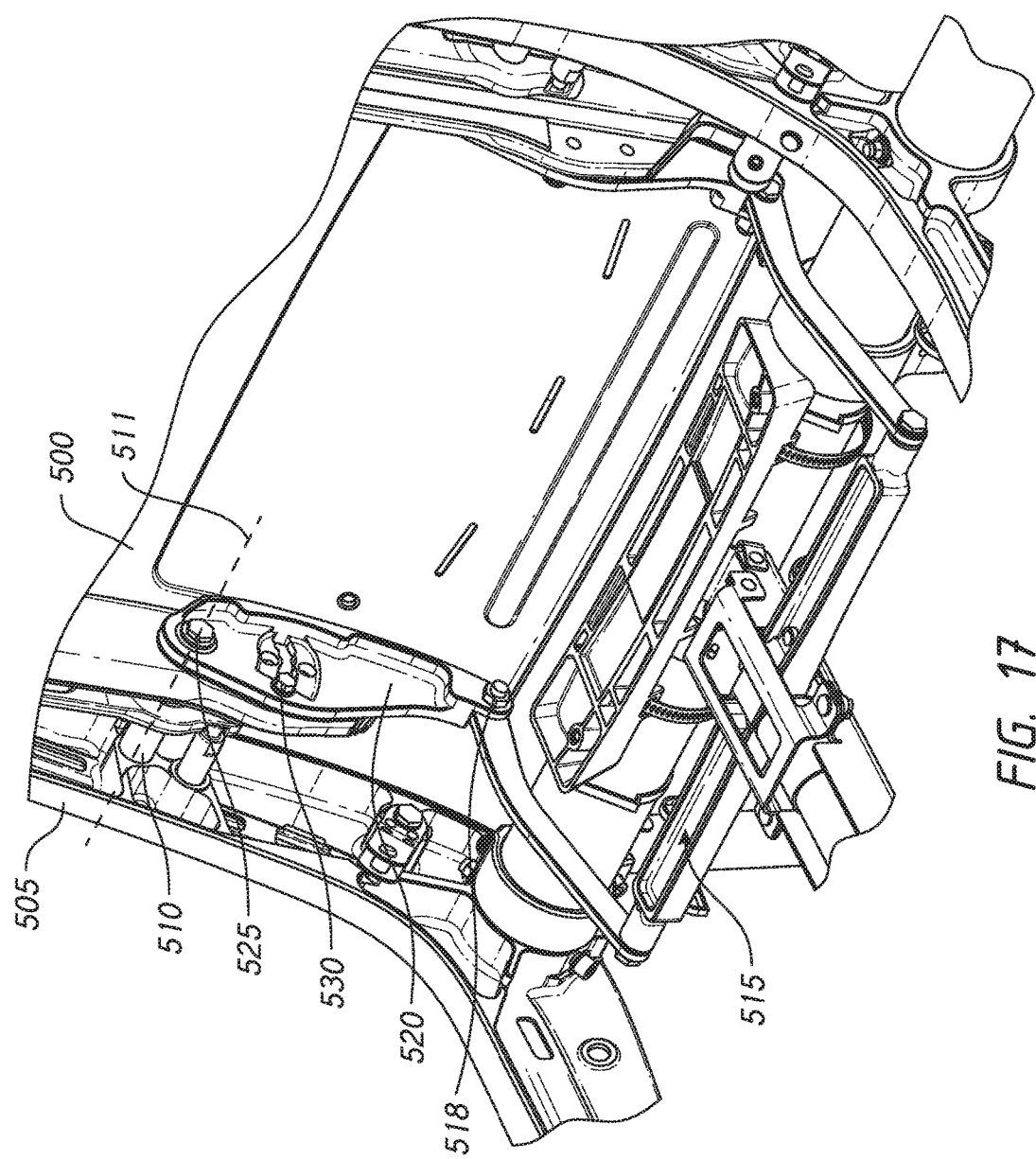
FIG. 17 illustrates a front perspective view of an embodiment of a seat with an energy absorbing system.

With reference first to FIG. 17, the seat back 500 can be pivotally coupled to one or more spreaders 505 via fasteners 510 such as, but not limited to, pins, screws, rivets, bolts, nuts, and the like. In some embodiments, the seat back 500 can rotate about an axis 511 at the coupling. This axis 511 can be generally horizontal such that it is parallel to the bottom of the seat, and can extend through the seat back 500. As shown in the illustrated embodiment, the seat back 500 can be coupled to components of a recline mechanism 515. The recline mechanism 515 can include features and/or components which are the same or similar to those described in U.S. Publication No. 2016/0297533, the entirety of which has been incorporated by reference herein. As shown, the seat back 500 can be indirectly coupled to components of the recline mechanism 515 via a mount such as a bracket 520. The seat back 500 can be attached to the bracket 520 via one or more fasteners including, but not limited to, mechanical fasteners, such as pins, screws, rivets, bolts, nuts, chemical fasteners such as adhesives, fastening techniques such as welding, any other fastener or technique as desired, and/or a combination of such fasteners and/or techniques. In the illustrated embodiment, the seat back 500 can be attached to the bracket 500 via a first fastener 525 and a second fastener 530. The first fastener 525 can be unitary with the fastener 510 used to pivotally couple the seat back 500 to the spreader 505.

Figure 18C:
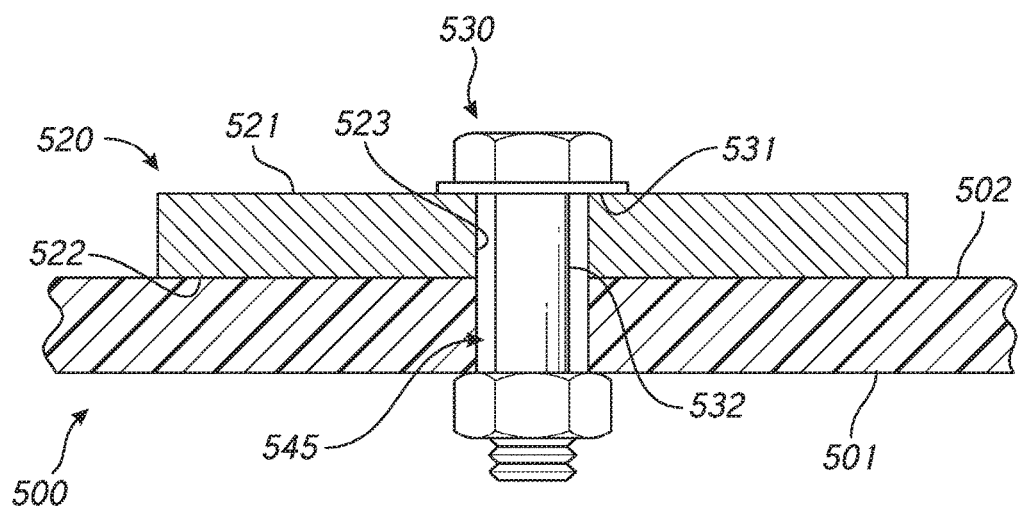
FIG. 18C illustrates a schematic cross-section of the seat and bracket of FIG. 17 along a first zone.

With reference next to FIGS. 18A-18D, an embodiment of a bracket 520 is illustrated. With reference first to FIG. 18A, the bracket 520 can include a first mounting location 535, such as a hole or aperture, which can receive the first fastener 525. In some embodiments, this can allow the bracket 520 to be coupled to the seat back 500 at the pivot point between the seat back 500 and the spreader 505. This can allow the bracket 520 to pivot along with the seat back 500. For example, the bracket 520 can pivot along with the seat back 500 when the seat back 500 is reclined via the recline mechanism 515.

The bracket 520 can include an energy absorption zone 540. As shown in the illustrated embodiment, the energy absorption zone 540 can include a first interacting surface or set of surfaces, such as outer surface 521, inner surface 522, and/or transverse surface 523 of the bracket 520 (as shown in FIG. 18C), defining a slot 545 which can interface with a second interacting surface or set of surfaces, such as the inner surface 531 and/or transverse surface 532 of a second fastener 530 received in the slot 545. The slot 545 can allow the bracket 520 to be coupled to the seat back 500 at a point separate from first mounting location 535. In embodiments where the seat 500 and bracket 520 pivot about the first mounting location 535, this can allow the bracket 520 to resist torques about the pivot point thereby maintaining the seat back 500 in position relative to the bracket 520.

As shown in the illustrated embodiment, the slot 545 can be curved. The slot 545 can be curved such that the radius of curvature originates at or proximate the center of the pivot point (e.g., fastener 510) of the seat back 500 and the spreader 505. This can follow the arcuate path of the fastener 530 as the seat back 500 rotates relative to the bracket 520. Although the slot 545 is shown positioned below the first mounting location 545, it is to be understood that the slot 545 can be positioned at any other location on the bracket 520 such as above the bracket 520. Moreover, although the slot 545 is shown with a curved configuration, it is to be understood that the slot 545 can have other shapes. For example, the slot 545 can be linear. This can be advantageous in situations where the seat back 500 is intended to translate relative to the bracket 520.

The bracket 520 can include a second mounting location 536, such as a hole or aperture, which can receive a fastener 518 which can allow the bracket 520 to be coupled to other components of the seating assembly. For example, this can allow the bracket 520 to be coupled to the recline mechanism 515. As shown, the bracket 520 can be rotatably coupled to the recline mechanism 515.

With reference next to FIG. 18B, the energy absorption zone 540 can include geometry and/or structures which provide for various stages of energy absorption. These various stages of energy absorption can control movement of the seat back 500 (e.g., pivoting of the seat back 500) to reduce potential trauma to passengers, such as rear-seated passengers whose head may contact the rear of the seat back 500 during a high deceleration event. In some embodiments, this geometry can be implemented about the slot 545.

Figure 19A:
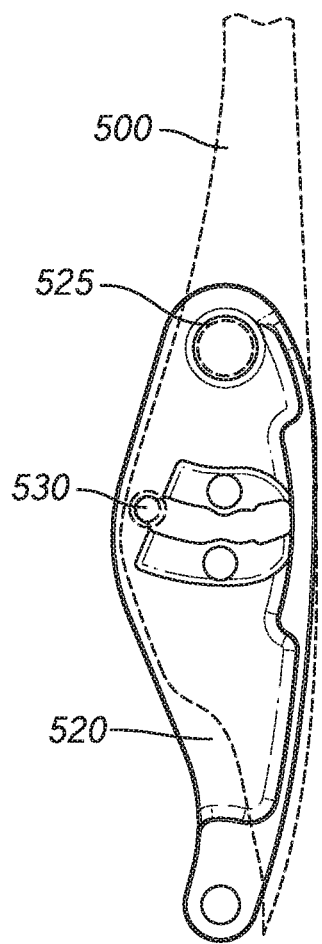
FIG. 19A illustrates a schematic of an embodiment of a seat with an energy absorbing system in a first, initial position relative to a bracket.
Figure 19B:
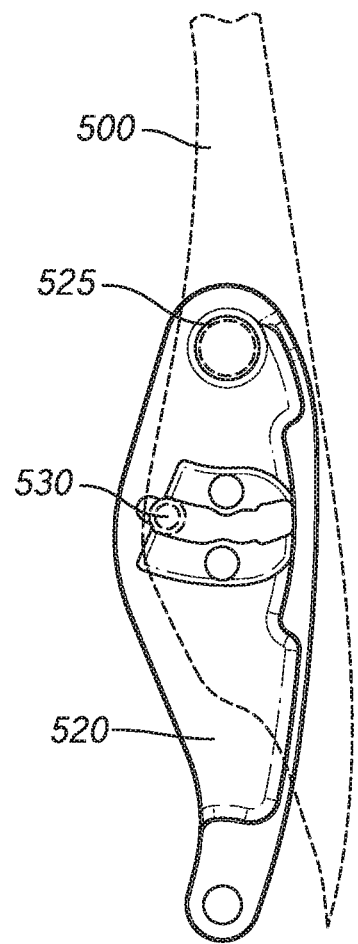
FIG. 19B illustrates a schematic of the seat of FIG. 19A in a second position relative to the bracket.
Figure 19C:
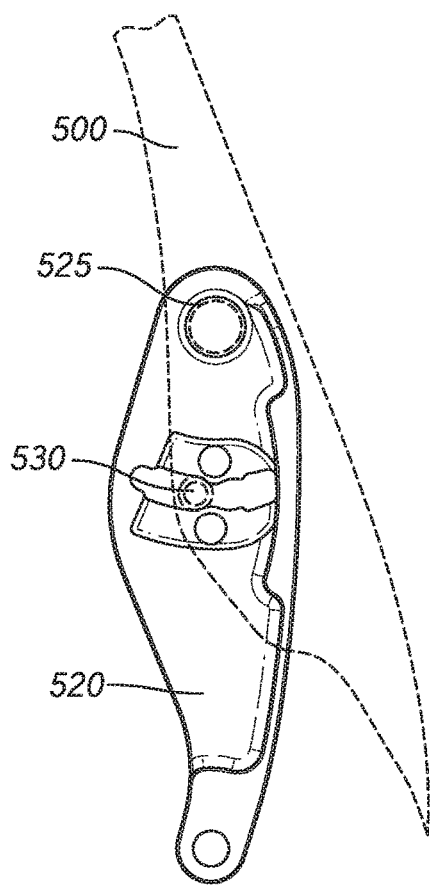
FIG. 19C illustrates a schematic of the seat of FIG. 19A in a third position relative to the bracket.
Figure 19D:
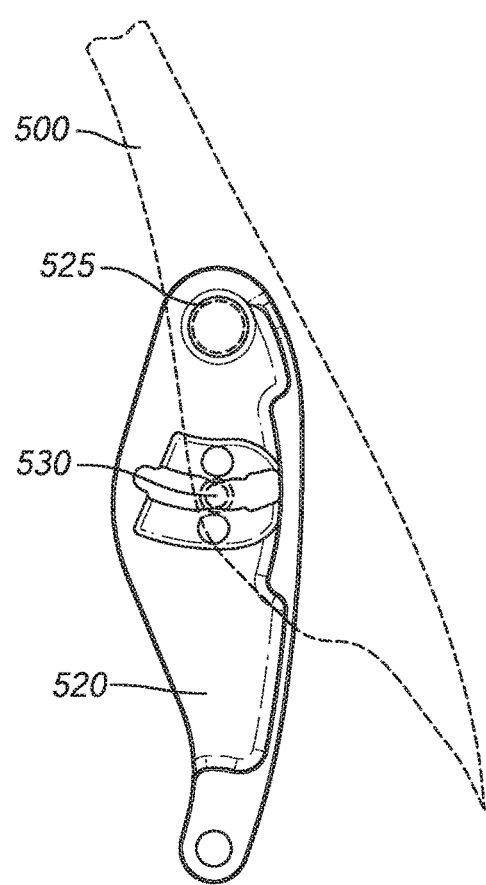
FIG. 19D illustrates a schematic of the seat of FIG. 19A in a fourth position relative to the bracket.
Figures 19E, 19F:
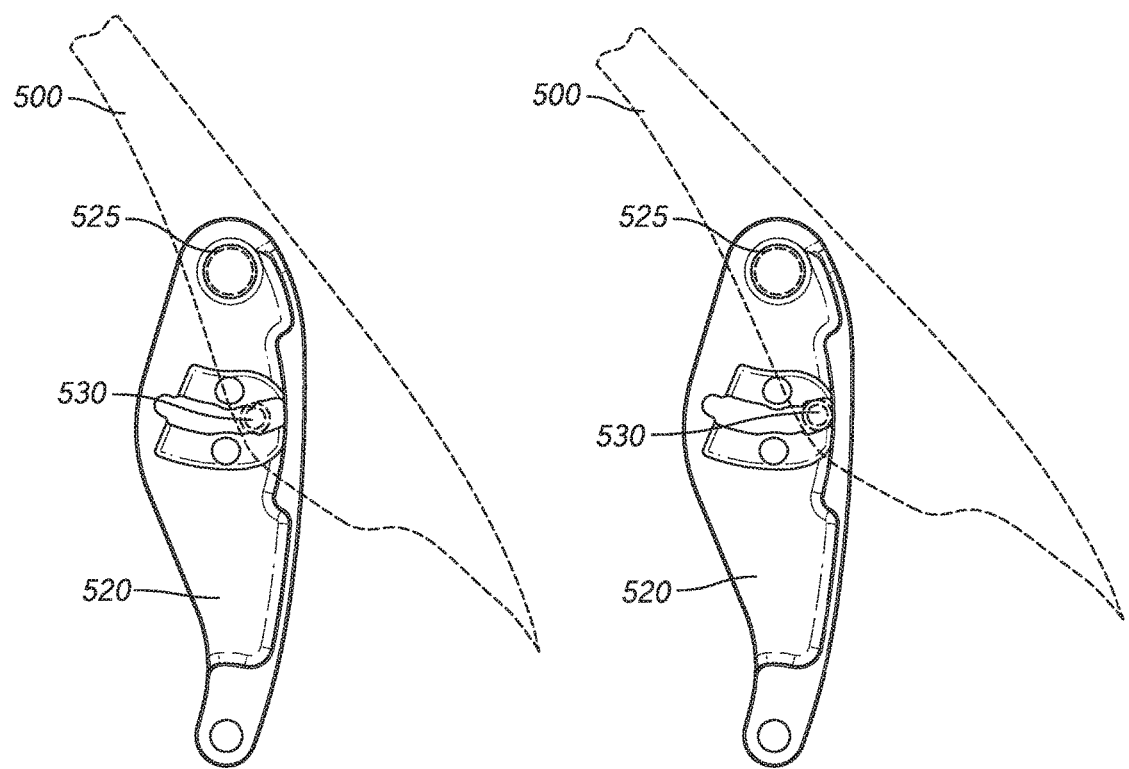
FIG. 19E illustrates a schematic of the seat of FIG. 19A in a fifth position relative to the bracket.
FIG. 19F illustrates a schematic of the seat of FIG. 19A in a sixth position relative to the bracket.

As shown, a first region 550 of the energy absorption zone 540 can include a location 551 at which the second fastener 530 would be initially positioned when the seat back 500 is in a default or initial position relative to the bracket 520 (as shown in FIG. 19A). The first region 550 can extend between a range of positions of the seat back 500 relative to the bracket 520. For example, the seat can be in the first region 550 while the seat back 500 is positioned at the first, initial position relative to the bracket 520 (see FIG. 19A) and until the seat back 500 reaches a second position relative to the bracket 520 (see FIG. 19B). In some embodiments, such as those where the seat back 500 pivots relative to the bracket 520, the first region 550 can encompass a pivot range of between about 1 degree to about 10 degrees, between about 2 degrees to about 8 degrees, between about 3 degrees to about 6 degrees, between about 1 degrees to about 5 degrees, any sub-range within these ranges, or any other range as desired. This can beneficially allow the seat back 500 to move relative to the bracket 520 from the first, initial position relative to the bracket 520 to the second position relative to the bracket 520 when initially subject to a high deceleration event.

However, it is to be understood that other ranges of movement are contemplated. In some embodiments, such as those where the seat back 500 pivots relative to the bracket 520, the first region 550 can encompass a pivot range of between about 0.5 degrees to about 60 degrees, between about 0.75 degrees to about 45 degrees, between about 1 degree to about 30 degrees, between about 1 degree to about 10 degrees, between about 2 degrees to about 8 degrees, between about 3 degrees to about 6 degrees, between about 1 degrees to about 5 degrees, any sub-range within these ranges, or any other range as desired. It is to be understood that the range of positions of the first region 550 can be chosen based on usage for the seat back 500 and/or desired movement of the seat back 500 in the event of a high deceleration event.

With reference to FIGS. 18B and 18C, the first region 550 can be a movement-restricting region 550. At the first region 550 of the energy absorption zone 540, the seat back 500 can be inhibited from moving relative to the bracket 520 until subject to a force which exceeds a first threshold force. This can be beneficial in ensuring that the seat back 500 remains in position relative to the bracket 520 under normal operating conditions. This first threshold force can be primarily static and/or dynamic frictional forces between interfacing surfaces of the fastener 530, the bracket 520, and/or the seat back 500. For example, in the illustrated embodiment, this can be a cumulative frictional force between at least the outer surface 521 of the bracket 520 and the inner surface 531 of the fastener 530 as well as the inner surface 522 of the bracket 520 and the inner surface 502 of the seat back 500.

As shown in the illustrated embodiment, friction between the fastener 530, the bracket 520, and/or the seat back 500 at the first region 550 can inhibit the seat back 500 from pivoting relative to the bracket 520 about the pivot point (e.g., first mounting location 535) during normal operation of the seat back 500 (e.g., forces caused by a seated passenger and/or forces caused by a rear-seated passenger interacting with the seat back 500). However, the friction between the fastener 530, the bracket 520, and/or the seat back 500 may allow the seat back to pivot about the pivot point (e.g., first mounting location 535) during abnormal operation of the seat back 500. For example, friction between the fastener 530, the bracket 520, and/or the seat back 500 may allow the seat back to pivot about the pivot point (e.g., first mounting location 535) due to a high deceleration event.

In some embodiments, the first threshold force can be greater than about 15 $lb_f$, greater than about 20 $lb_f$, greater than about 25 $lb_f$, greater than about 30 $lb_f$, greater than about 35 $lb_f$, greater than about 40 $lb_f$, greater than about 45 $lb_f$, greater than about 50 $lb_f$, greater than about 55 $lb_f$, any amount within these stated amounts, or other forces as desired. In some embodiments, the first threshold force can be between about 10 $lb_f$ to about 60 $lb_f$, between about 15 $lb_f$ to about 55 $lb_f$, between about 20 $lb_f$ to about 50 $lb_f$, about 25 $lb_f$ to about 45 $lb_f$, any sub-range within these ranges, or any other range as desired. This can beneficially allow the seat back 500 to move relative to the bracket 520 when subject to a high deceleration event while inhibiting movement of the seat back 500 relative to the bracket 520 due to forces imposed on the seat back 500 during normal operation.

However, it is to be understood that other ranges of threshold forces are contemplated. In some embodiments, the first threshold force can be greater than about 5 $lb_f$, greater than about 10 $lb_f$, greater than about 15 $lb_f$, greater than about 20 $lb_f$, greater than about 25 $lb_f$, greater than about 30 $lb_f$, greater than about 35 $lb_f$, greater than about 40 $lb_f$, greater than about 45 $lb_f$, greater than about 50 $lb_f$, greater than about 55 $lb_f$, greater than about 60 $lb_f$, greater than about 65 $lb_f$, greater than about 70 $lb_f$, greater than about 80 $lb_f$, greater than about 90 $lb_f$, greater than about 100 $lb_f$, greater than about 120 $lb_f$, greater than about 140 $lb_f$, greater than about 160 $lb_f$, greater than about 180 $lb_f$, any amount within these stated amounts, or other forces as desired. In some embodiments, the first threshold force can be between about 1 $lb_f$ to about 150 $lb_f$, between about 5 $lb_f$ to about 100 $lb_f$, between about 10 $lb_f$ to about 60 $lb_f$, between about 15 $lb_f$ to about 55 $lb_f$, between about 20 $lb_f$ to about 50 $lb_f$, about 25 $lb_f$ to about 45 $lb_f$, any sub-range within these ranges, or any other range as desired.

In some embodiments, the first threshold force can be based on acceleration/deceleration (e.g., g-forces). In some embodiments, the threshold force can be greater than about 8 g-forces, greater than about 10 g-forces, greater than about 12 g-forces, greater than about 14 g-forces, greater than about 16 g-forces, greater than about 18 g-forces, any sub-range within these ranges, or any other force as desired. In some embodiments, the first threshold force can be between about 10 g-forces to about 20 g-forces, between about 12 g-forces to about 18 g-forces, between about 14 g-forces to about 16 g-forces, any sub-range within these ranges, or any other g-force as desired. This can beneficially allow the seat back 500 to move relative to the bracket 520 when subject to a high deceleration event while inhibiting movement of the seat back 500 relative to the bracket 520 due to forces imposed on the seat back 500 during normal operation.

However, it is to be understood that other ranges of threshold forces are contemplated. In some embodiments, the threshold force can be greater than about 2 g-forces, greater than about 4 g-forces, greater than about 6 g-forces, greater than about 8 g-forces, greater than about 10 g-forces, greater than about 12 g-forces, greater than about 14 g-forces, greater than about 16 g-forces, greater than about 18 g-forces, greater than about 20 g-forces, greater than about 25 g-forces, greater than about 30 g-forces, greater than about 35 g-forces, greater than about 40 g-forces, greater than about 50 g-forces, greater than about 60 g-forces, greater than about 70 g-forces, greater than about 80 g-forces, greater than about 100 g-forces, any sub-range within these ranges, or any other force as desired. In some embodiments, the first threshold force can be between about 1 g-forces to about 100 g-forces, between about 2 g-forces to about 80 g-forces, between about 5 g-forces to about 50 g-forces, between about 8 g-forces to about 30 g-forces, between about 10 g-forces to about 20 g-forces, between about 12 g-forces to about 18 g-forces, between about 14 g-forces to about 16 g-forces, any sub-range within these ranges, or any other g-force as desired.

In some embodiments, the first threshold force can be chosen based on operating parameters for the seat. For example, the first threshold force can differ for a heavier seat as compared to a lighter seat. As another example, the first threshold force can differ for different types of vehicles (e.g., aircraft, automobiles, etc.). In some embodiments, the first threshold force can be modified by altering the amount of force applied by the fastener 530 on the bracket 520 and the seat back 520 which can modify the friction between the fastener 530, the bracket 520, and the seat back 520. In embodiments utilizing a rotating fastener, such as a screw, nut or bolt, this can be accomplished by altering the torque. In some embodiments, the first threshold force can be modified by altering one or more interfacing surfaces. For example, one or more interfacing surfaces can be altered to increase or decrease the coefficient of friction. As another example, a chemical adhesive can be used between one or more interfacing surfaces to couple the surfaces together. When subject to the first threshold force, the chemical adhesive can sever.

Figure 18D:
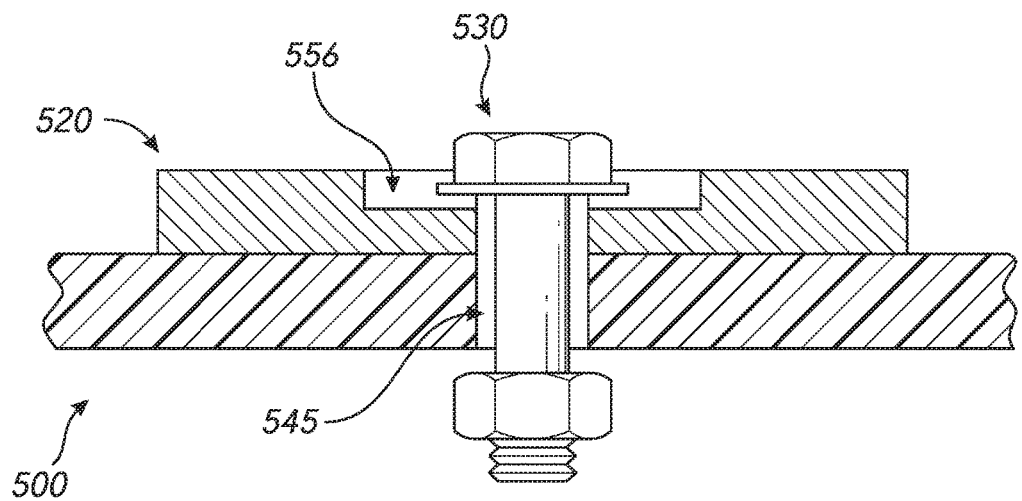
FIG. 18D illustrates a schematic cross-section of the seat and bracket of FIG. 17 along a second zone.

With reference to FIGS. 18B and 18D, a second region 555 of the energy absorption zone 540 can include a recessed area 556. The second region 555 can extend between a range of positions of the seat back 500 relative to the bracket 520. For example, the seat can be in the second region 555 while the seat back 500 is positioned at the second position relative to the bracket 520 (see FIG. 19B) and until the seat back 500 reaches a third position relative to the bracket 520 (see FIG. 19C). In some embodiments, such as those where the seat back 500 pivots relative to the bracket 520, the second region 555 can encompass a pivot range of between about 1 degree to about 18 degrees, between about 2 degrees to about 16 degrees, between about 3 degrees to about 14 degrees, between about 4 degrees to about 12 degrees, any sub-range within these ranges, or any other range as desired. This can beneficially allow the seat back 500 to move relative to the bracket 520 from the second position relative to the bracket 520 to the third position relative to the bracket 520 after being initially subject to a high deceleration event. The third position can be more advantageously oriented to receive an initial impact when struck by the head of a rear-seated passenger.

However, it is to be understood that other ranges of movement are contemplated. In some embodiments, such as those where the seat back 500 pivots relative to the bracket 520, the second region 555 can encompass a pivot range of between about 0.5 degrees to about 60 degrees, between about 0.75 degrees to about 45 degrees, between about 1 degree to about 30 degrees, between about 1 degree to about 18 degrees, between about 2 degrees to about 16 degrees, between about 3 degrees to about 14 degrees, between about 4 degrees to about 12 degrees, any sub-range within these ranges, or any other range as desired. It is to be understood that the range of positions of the second region 555 can be chosen based on usage for the seat back 500 and/or desired movement of the seat back 500 in the event of a high deceleration event.

In some embodiments, such as those where the seat back 500 pivots relative to the bracket 520, the first region 550 and the second region 555 can encompass a pivot range of between about 2 degree to about 20 degrees, between about 4 degrees to about 18 degrees, between about 6 degrees to about 16 degrees, between about 8 degrees to about 14 degrees, any sub-range within these ranges, or any other range as desired. This can beneficially allow the seat back 500 to move relative to the bracket 520 from the first, initial position relative to the bracket 520 to the third position relative to the bracket 520 after being initially subject to a high deceleration event. The third position can be more advantageously oriented to receive an initial impact when struck by the head of a rear-seated passenger.

However, it is to be understood that other ranges of movement are contemplated. In some embodiments, such as those where the seat back 500 pivots relative to the bracket 520, the first region 550 and the second region 555 can encompass a pivot range of between about 0.5 degrees to about 60 degrees, between about 0.75 degrees to about 45 degrees, between about 1 degree to about 30 degrees, between about 2 degree to about 20 degrees, between about 4 degrees to about 18 degrees, between about 6 degrees to about 16 degrees, between about 8 degrees to about 14 degrees, any sub-range within these ranges, or any other range as desired. It is to be understood that the range of positions of the second region 555 can be chosen based on usage for the seat back 500 and/or desired movement of the seat back 500 in the event of a high deceleration event.

The second region 555 can be a free-movement region. At the second region 555 of the energy absorption zone 540, the seat back 500 may be allowed to move relatively freely relative to the bracket 520. For example, the seat back 500 may be subject to little to no resistance while the seat is in the second region 555. This can be beneficial in ensuring that the seat back 500 rapidly traverses the extent of the second region 555 and is at the third position relative to the bracket 520 (see FIG. 19C). In some embodiments, this third position can be chosen such that the seat back 500 is angled at a position which would reduce potential trauma to a rear-seated passenger's head in the event of a high deceleration event. It is to be understood that while the seat back 500 has been described as relatively freely relative to the bracket 520, in some embodiments the seat back 500 can be inhibited from moving relative to the bracket 520 until subject to a force which exceeds a second threshold force. For example, there may be some frictional forces between surfaces of the fastener 530, the bracket 520, and/or the seat back 500.

As shown in the illustrated embodiment, the fastener 530 can enter a recessed area 556. The recessed area 556 can have a reduced thickness as compared to the initial location 551. Due to the reduced thickness of the recessed area 556, there can be substantially less friction between the fastener 530, the bracket 520, and/or the seat back 500. As such, the seat back 500 is allowed to further pivot with substantially less resistance as compared to the first region 550. As shown in the illustrated embodiment, the recessed area 556 immediately follows the location 551 at which the fastener 530 is located when the seat back 530 is in the first, initial position relative to the bracket 520. This can beneficially allow the seat back 500 to quickly pivot once the first threshold force is initially exceeded.

With reference to FIG. 18B, a third region 560 of the energy absorption zone 540 can include a narrowed or reduced-size region 561 in the slot 545. The third region 560 can extend between a range of positions of the seat back 500 relative to the bracket 520. For example, the seat can be in the third region 560 while the seat back 500 is positioned at the third position relative to the bracket 520 (see FIG. 19C) and until the seat back 500 reaches a fourth position relative to the bracket 520 (see FIG. 19D). In some embodiments, such as those where the seat back 500 pivots relative to the bracket 520, the third region 560 can encompass a pivot range of between about 0.5 degrees to about 5 degrees, between about 1 degree to about 4 degrees, between about 1.5 degrees to about 3 degrees, any sub-range within these ranges, or any other range as desired. This can beneficially allow the seat back 500 to move relative to the bracket 520 from the third position relative to the bracket 520 to the fourth position relative to the bracket 520 when initially subject to a strike from the head of a rear-seated passenger.

However, it is to be understood that a other ranges of movement are contemplated. In some embodiments, such as those where the seat back 500 pivots relative to the bracket 520, the third region 560 can encompass a pivot range of between about between about 0.1 degrees to about 25 degrees, between about 0.2 degrees to about 20 degrees, between about 0.25 degrees to about 15 degrees, 0.5 degrees to about 5 degrees, between about 1 degree to about 4 degrees, between about 1.5 degrees to about 3 degrees, any sub-range within these ranges, or any other range as desired. It is to be understood that the range of positions of the third region 560 can be chosen based on usage for the seat back 500 and/or desired movement of the seat back 500 in the event of a high deceleration event.

The third region 560 can be a movement-restricting region. At the third region 560 of the energy absorption zone 540, the seat back 500 can be inhibited from moving relative to the bracket 520 until subject to a force which exceeds a third threshold force. This can be beneficial in ensuring that the seat back 500 remains in position relative to the bracket 520 until the seat back 500 is acted upon by another force. For example, this can be the force caused by a rear-seated passenger's head due to a high deceleration event. This third threshold force can be primarily based on deforming material of the bracket 520. For example, in the illustrated embodiment, the reduced-size region 561 can form a detent in the slot 545 and the third threshold force can be the amount of force needed to deform the detent sufficiently to allow the fastener 530 to pass therethrough. In some implementations, this third threshold force can be based on force that may be applied to the seat back 500 due to a rear-seated passenger's head striking the seat back 500. This can help to initially cushion the rear-seated passenger's head and reduce impact forces on a passenger's head during a high deceleration event.

In some embodiments, the third threshold force can be greater than about 60 $lb_f$, greater than about 80 $lb_f$, greater than about 100 $lb_f$, greater than about 120 $lb_f$, greater than about 140 $lb_f$, greater than about 160 $lb_f$, greater than about 180 $lb_f$, any amount within these stated amounts, or other forces as desired. In some embodiments, the third threshold force can be between about 60 $lb_f$ to about 180 $lb_f$, between about 80 $lb_f$ to about 160 $lb_f$, between about 100 $lb_f$ to about 140 $lb_f$, any sub-range within these ranges, or any other range as desired. This can beneficially allow the seat back 500 to move relative to the bracket 520 after being subject to an initial impact from the head of a rear-seated passenger.

However, it is to be understood that other ranges of threshold forces are contemplated. In some embodiments, the third threshold force can be greater than about 5 $lb_f$, greater than about 10 $lb_f$, greater than about 15 $lb_f$, greater than about 20 $lb_f$, greater than about 25 $lb_f$, greater than about 30 $lb_f$, greater than about 35 $lb_f$, greater than about 40 $lb_f$, greater than about 45 $lb_f$, greater than about 50 $lb_f$, greater than about 55 $lb_f$, greater than about 60 $lb_f$, greater than about 80 $lb_f$, greater than about 100 $lb_f$, greater than about 120 $lb_f$, greater than about 140 $lb_f$, greater than about 160 $lb_f$, greater than about 180 $lb_f$, any amount within these stated amounts, or other forces as desired. In some embodiments, the third threshold force can be between about 10 $lb_f$ to about 300 $lb_f$, between about 20 $lb_f$ to about 250 $lb_f$, between about 40 $lb_f$ to about 200 $lb_f$, between about 60 $lb_f$ to about 180 $lb_f$, between about 80 $lb_f$ to about 160 $lb_f$, between about 100 $lb_f$ to about 140 $lb_f$, any sub-range within these ranges, or any other range as desired.

In some embodiments, the third threshold force can be based on acceleration/deceleration (e.g., g-forces). In some embodiments, the third threshold force can be greater than about 20 g-forces, greater than about 40 g-forces, greater than about 60 g-forces, greater than about 80 g-forces, greater than about 100 g-forces, greater than about 120 g-forces, any sub-range within these ranges, or any other force as desired. In some embodiments, the third threshold force can be between about 20 g-forces to about 120 g-forces, between about 30 g-forces to about 90 g-forces, between about 40 g-forces to about 60 g-forces, any sub-range within these ranges, or any other g-force as desired. This can beneficially allow the seat back 500 to move relative to the bracket 520 after being subject to an initial impact from the head of a rear-seated passenger.

However, it is to be understood that other ranges of threshold forces are contemplated. In some embodiments, the third threshold force can be greater than about 2 g-forces, greater than about 4 g-forces, greater than about 6 g-forces, greater than about 8 g-forces, greater than about 10 g-forces, greater than about 12 g-forces, greater than about 14 g-forces, greater than about 16 g-forces, greater than about 18 g-forces, greater than about 20 g-forces, greater than about 40 g-forces, greater than about 60 g-forces, greater than about 80 g-forces, greater than about 100 g-forces, greater than about 120 g-forces, any sub-range within these ranges, or any other force as desired. In some embodiments, the third threshold force can be between about 1 g-forces to about 200 g-forces, between about 5 g-forces to about 175 g-forces, between about 10 g-forces to about 150 g-forces, be between about 20 g-forces to about 120 g-forces, between about 30 g-forces to about 90 g-forces, between about 40 g-forces to about 60 g-forces, any sub-range within these ranges, or any other g-force as desired.

In some embodiments, the third threshold force can be chosen based on operating parameters for the seat. For example, the third threshold force can differ for a heavier seat as compared to a lighter seat. As another example, the third threshold force can differ for different types of vehicles (e.g., aircraft, automobiles, etc.). In some embodiments, the third threshold force can be modified by altering the material used in the third region 560 such that a lesser or greater amount of force is required to deform the material. In some embodiments, the third threshold force can be modified altering the structure surrounding the third region 560. For example, as shown in the illustrated embodiment, cutouts 562 can be positioned proximate the reduced-size region 561. The size and geometry of these cutouts 562 can be chosen to vary the threshold force. As another example, the thickness of the reduced-size region 561 can be altered.

With continued reference to FIG. 18B, a fourth region 565 of the energy absorption zone 540 can include a tapering region in the slot 545 such that the slot 545 progressively narrows over the fourth region 565. The fourth region 565 can extend between a range of positions of the seat back 500 relative to the bracket 520. For example, the seat can be in the fourth region 565 while the seat back 500 is positioned at the fourth position relative to the bracket 520 (see FIG. 19D) and until the seat back 500 reaches a fifth position relative to the bracket 520 (see FIG. 19E). In some embodiments, such as those where the seat back 500 pivots relative to the bracket 520, the fourth region 565 can encompass a pivot range of between about 1 degree to about 18 degrees, between about 2 degrees to about 16 degrees, between about 3 degrees to about 14 degrees, between about 4 degrees to about 12 degrees, any sub-range within these ranges, or any other range as desired. This can beneficially allow the seat back 500 to move relative to the bracket 520 from the fourth position relative to the bracket 520 to the fifth position relative to the bracket 520 while cushioning a head of a rear-seated passenger.

However, it is to be understood that other ranges of movement are contemplated. In some embodiments, such as those where the seat back 500 pivots relative to the bracket 520, the fourth region 565 can encompass a pivot range of between about 0.5 degree to about 60 degrees, between about 0.75 degrees to about 45 degrees, between about 1 degree to about 30 degrees, between about 1 degree to about 18 degrees, between about 2 degrees to about 16 degrees, between about 3 degrees to about 14 degrees, between about 4 degrees to about 12 degrees, any sub-range within these ranges, or any other range as desired. It is to be understood that the range of positions of the fourth region 565 can be chosen based on usage for the seat back 500 and/or desired movement of the seat back 500 in the event of a high deceleration event.

The fourth region 565 can be a movement-restricting region. At the fourth region 565 of the energy absorption zone 540, the seat back 500 can be inhibited from moving relative to the bracket 520 until subject to a force which exceeds a fourth threshold force. This fourth threshold force can be constant, progressively increase, and/or progressively decrease across the extent of the fourth region 565. This can beneficially apply a counter force to a rear-seated passenger's head which can decelerate the rear-seated passenger's head in a controlled manner. This fourth threshold force, or range of forces, can be primarily based on deforming material of the bracket 520. For example, in the illustrated embodiment, the tapering in the slot 545 can require a sufficient amount of force to deform the detent sufficiently to allow the fastener 530 to pass therethrough. In some implementations, this fourth threshold force can be based on force that may be applied to the seat back 500 due to a rear-seated passenger's head striking the seat back 500. This can help to cushion the rear-seated passenger's head and reduce impact forces on a passenger's head during a high deceleration event.

In some embodiments, the fourth threshold force can be initially less third threshold force. In some embodiments, the fourth threshold force can increase to an amount which is equal to or greater than the third threshold force.

In some embodiments, the fourth threshold force can be greater than about 40 $lb_f$, greater than about 60 $lb_f$, greater than about 80 $lb_f$, greater than about 100 $lb_f$, greater than about 120 $lb_f$, greater than about 140 $lb_f$, greater than about 160 $lb_f$, any amount within these stated amounts, or other forces as desired. In some embodiments, the fourth threshold force can be between about 40 $lb_f$ to about 160 $lb_f$, between about 60 $lb_f$ to about 140 $lb_f$, between about 80 $lb_f$ to about 120 $lb_f$, any sub-range within these ranges, or any other range as desired. This can beneficially allow the seat back 500 to move relative to the bracket 520 while imparting a counteracting force upon a rear-seated passenger's head to cushion and decelerate the rear-seated passenger's head.

However, it is to be understood that other ranges of threshold forces are contemplated. In some embodiments, the fourth threshold force can be greater than about 5 $lb_f$, greater than about 10 $lb_f$, greater than about 20 $lb_f$, greater than about 40 $lb_f$, greater than about 60 $lb_f$, greater than about 80 $lb_f$, greater than about 100 $lb_f$, greater than about 120 $lb_f$, greater than about 140 $lb_f$, greater than about 160 $lb_f$, greater than about 200 $lb_f$, greater than about 250 $lb_f$, any amount within these stated amounts, or other forces as desired. In some embodiments, the fourth threshold force can be between about 5 $lb_f$ to about 300 $lb_f$, between about 10 $lb_f$ to about 250 $lb_f$, between about 20 $lb_f$ to about 200 $lb_f$, between about 40 $lb_f$ to about 160 $lb_f$, between about 60 $lb_f$ to about 140 $lb_f$, between about 80 $lb_f$ to about 120 $lb_f$, any sub-range within these ranges, or any other range as desired.

In some embodiments, the fourth threshold force can be based on acceleration/deceleration (e.g., g-forces). In some embodiments, the threshold force can be greater than about 10 g-forces, greater than about 20 g-forces, greater than about 30 g-forces, greater than about 40 g-forces, greater than about 50 g-forces, greater than about 60 g-forces, any sub-range within these ranges, or any other force as desired. In some embodiments, the fourth threshold force can be between about 10 g-forces to about 60 g-forces, between about 20 g-forces to about 50 g-forces, between about 30 g-forces to about 40 g-forces, any sub-range within these ranges, or any other g-force as desired. This can beneficially allow the seat back 500 to move relative to the bracket 520 while imparting a counteracting force upon a rear-seated passenger's head to cushion and decelerate the rear-seated passenger's head.

However, it is to be understood that other ranges of threshold forces are contemplated. In some embodiments, the threshold force can be greater than about 1 g-forces, greater than about 2 g-forces, greater than about 5 g-forces, greater than about 10 g-forces, greater than about 20 g-forces, greater than about 30 g-forces, greater than about 40 g-forces, greater than about 50 g-forces, greater than about 60 g-forces, greater than about 80 g-forces, greater than about 100 g-forces, greater than about 125 g-forces, greater than about 150 g-forces, any sub-range within these ranges, or any other force as desired. In some embodiments, the fourth threshold force can be between about 1 g-force to about 200 g-forces, between about 2 g-forces to about 150 g-forces, between about 5 g-forces to about 100 g-forces, between about 10 g-forces to about 60 g-forces, between about 20 g-forces to about 50 g-forces, between about 30 g-forces to about 40 g-forces, any sub-range within these ranges, or any other g-force as desired.

In some embodiments, the fourth threshold force can be chosen based on operating parameters for the seat. For example, the fourth threshold force can differ for a heavier seat as compared to a lighter seat. As another example, the fourth threshold force can differ for different types of vehicles (e.g., aircraft, automobiles, etc.). In some embodiments, the fourth threshold force can be modified by altering the material used in the fourth region 565 such that a lesser or greater amount of force is required to deform the material. In some embodiments, the fourth threshold force can be modified altering the structure surrounding the fourth region 565. For example, cutouts (not shown) can be incorporated into the structure. As another example, the thickness of material in the fourth region 565 can be altered.

With continued reference to FIG. 18B, a fifth region 570 of the energy absorption zone 540 can include a wide portion of the slot 545. The fifth region 570 can extend between a range of positions of the seat back 500 relative to the bracket 520. For example, the seat can be in the fifth region 570 while the seat back 500 is positioned at the fifth position relative to the bracket 520 (see FIG. 19E) and until the seat back 500 reaches a sixth position relative to the bracket 520 (see FIG. 19F). In some embodiments, such as those where the seat back 500 pivots relative to the bracket 520, the fifth region 570 can encompass a pivot range of between about 1 degree to about 18 degrees, between about 2 degrees to about 16 degrees, between about 3 degrees to about 14 degrees, between about 4 degrees to about 12 degrees, any sub-range within these ranges, or any other range as desired. This can beneficially allow the seat back 500 to rapidly move relative to the bracket 520 from the fifth position relative to the bracket 520 to the sixth position relative to the bracket 520 after cushioning the rear-seated passenger's head. The sixth position can be advantageously chosen to avoid contacting a rear-seated passenger's head or reduce any further trauma due to further contact with the rear-seated passenger's head.

However, it is to be understood that other ranges of movement are contemplated. In some embodiments, such as those where the seat back 500 pivots relative to the bracket 520, the fifth region 570 can encompass a pivot range of between about 0.5 degrees to about 60 degrees, between about 0.75 degrees to about 45 degrees, between about 1 degree to about 30 degrees, between about 1 degree to about 18 degrees, between about 2 degrees to about 16 degrees, between about 3 degrees to about 14 degrees, between about 4 degrees to about 12 degrees, any sub-range within these ranges, or any other range as desired. It is to be understood that the range of positions of the fifth region 570 can be chosen based on usage for the seat back 500 and/or desired movement of the seat back 500 in the event of a high deceleration event.

The fifth region 570 can be a free-movement region. At the fifth region 570 of the energy absorption zone 540, the seat back 500 may be allowed to move relatively freely relative to the bracket 520. For example, the seat back 500 may be subject to little to no resistance while the seat is in the fifth region 570 as a result of the wide portion of the slot 545. This can be beneficial in ensuring that the seat back 500 rapidly traverses the extent of the fifth region 570 and is at the sixth position relative to the bracket 520 (see FIG. 19F). In some embodiments, this sixth position can be chosen such that the seat back 500 is angled at a position which would reduce potential trauma to a rear-seated passenger's head in the event of a high deceleration event. It is to be understood that while the seat back 500 has been described as relatively freely relative to the bracket 520, in some embodiments the seat back 500 can be inhibited from moving relative to the bracket 520 until subject to a force which exceeds a fifth threshold force. For example, there may be some frictional forces between surfaces of the fastener 530, the bracket 520, and/or the seat back 500.

Although structures of the energy absorption zone 540 is illustrated on the bracket 520, it is to be understood that these structures can be implemented on the seat back 500 in part or in its entirety. For example, one or more of the regions 550, 555, 560, 565, 570 can be implemented on the seat back 500 and the remaining regions 550, 555, 560, 565, 570 can be implemented on the bracket 520. As another example, all of the regions 550, 555, 560, 565, 570 can be implemented on the seat back 500. Moreover, although five regions are described, it is to be understood that a fewer or greater number of regions can be implemented. In some embodiments, the fourth region 565 and the fifth region 570 can be omitted. It is also to be understood that any of the structures and/or geometries described in connection with a particular region can be implemented in any other region.

In the illustrated embodiment, a separate fastener 530 is shown passing through the energy absorption zone 540 and interacting with structures and/or geometry of the energy absorption zone 540 to control movement of the seat back 500 relative to the bracket 520. However, it is to be understood that other interacting structures can be used. For example, in some embodiments, a protrusion which projects from the surface of the seat back 500 can extend into the slot 545 and interact with structures and/or geometry of the energy absorption zone 540 to control movement of the seat back 500 relative to the bracket 520. Moreover, although the illustrated embodiment includes an interacting member in the form of a fastener 530 which couples the seat back 500 to the bracket 520, it is to be understood that the interacting member need not couple the seat back 500 to the bracket 520.

In the illustrated embodiment, the seat back 500 pivots relative to bracket 520. It is to be understood that in other embodiments, the seat back 500 can translate in one or more directions and/or rotate in one or more directions. Moreover, while the seat back 500 and the bracket 520 is coupled to a recline mechanism 515, it is to be understood that the seat back 500 and/or the bracket 520 can be attached to other components of the seat. It is also to be understood that the energy absorption assemblies and systems can be implemented with seats which do not have a recline mechanism.

Figure 20:
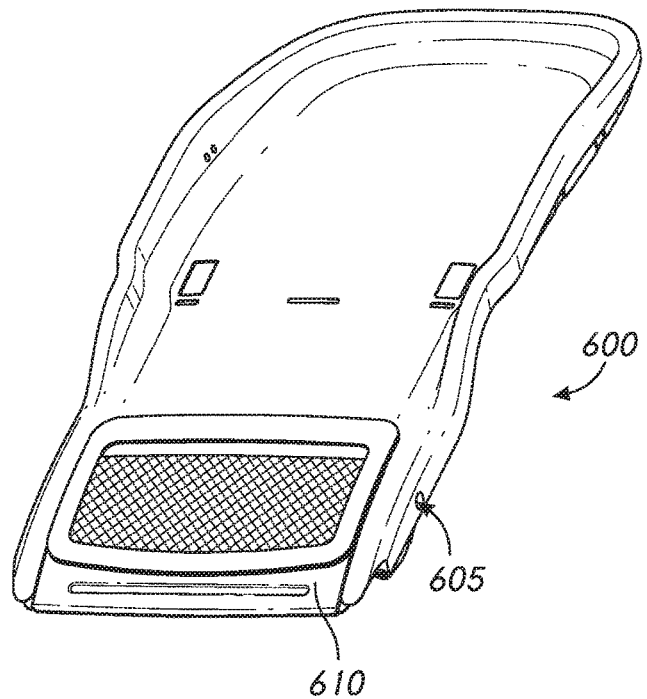
FIG. 20 illustrates an embodiment of a seat with a lower energy absorbing system in a first or initial configuration.
Figure 21:
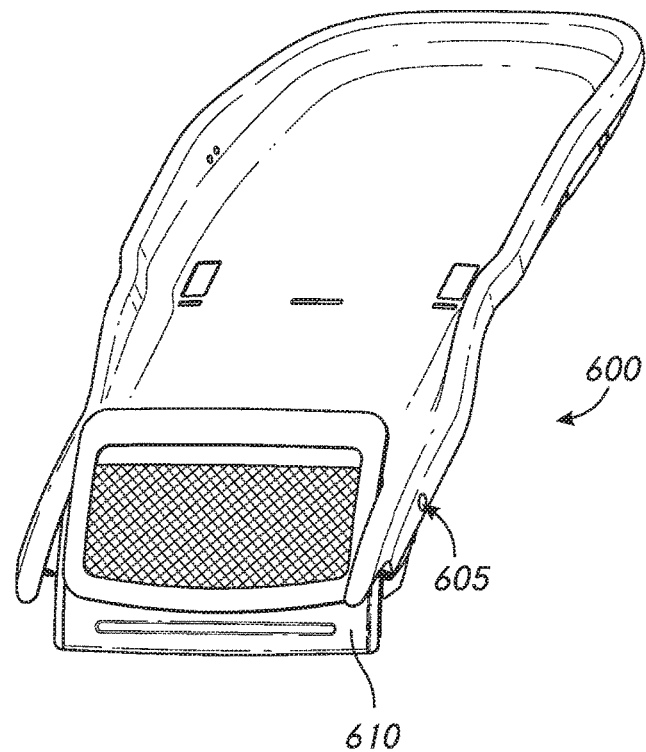
FIG. 21 illustrates the seat of FIG. 20 with the lower energy absorbing system in a second configuration.

FIGS. 20 and 21 illustrate an embodiment of a seat back 600 having a lower energy absorption system. In some embodiments, the components and features of seat back 600 can be used in combination with the components and features of seat back 500. However, it is to be understood that the components and features of seat back 600 can be used separately from the components and features of seat back 500.

With reference first to FIG. 20, the seat back 600 can be pivotally coupled to one or more spreaders (not shown) via fasteners such as pins, screws, bolts, nuts, and the like. As noted above, the seats described herein, such as seat back 500, can include components which allow an upper portion of the seat back to pivot forwardly relative to a coupling location 605. This can cause a lower portion of the seat back 600 to pivot rearwardly relative to the coupling location 605. In some situations, the ability of the upper portion of the seat back 600 to pivot forwardly relative to the coupling location 605 can be inhibited due to forwardly-directed forces applied below the coupling location 605. This can be caused due to contact between a rear-seated passenger's lower body (e.g., the passenger's knees, legs, and feet) contacting the lower portion of the seat back 600 during a higher deceleration event. This likelihood can be heightened when seats are positioned with a smaller distance or pitch between the seat backs.

In some embodiments, the seat back 600 can include a movable wall 610 below the coupling location 605 which can move forwardly or inwardly relative to other portions of the seat back 600. This can beneficially allow the upper portion of the seat back 600 to pivot forwardly even in the event that the lower portion of the seat back 600 is subject to a forwardly-directed force. As shown in FIG. 21, the movable portion 610 can be pivotal relative to other portions of the seat back 600. In some embodiments, the movable portion 610 can be translatable and/or rotatable relative to other portions of the seat back 600. As shown in the illustrated embodiment, the movable wall 610 can include pivot at a location below the coupling location 605. However, it is to be understood that the movable wall 610 can include a pivot at any other location of the seat back 600.

In some embodiments, the movable portion 610 can be a breakaway part which disassociates from other portions of the seat back 600 when subjected to forwardly-directed force which exceeds a threshold amount.

Other Embodiments

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value.

While certain embodiments have been described, these embodiments have been presented by way of example only, and are not intended to limit the scope of the disclosure. Indeed, the novel devices, system and methods described herein may be embodied in a variety of other forms. Furthermore, various omissions, substitutions and changes in the systems and methods described herein may be made. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A seat assembly comprising a storage sleeve configured to be attached to a surface of a seat of the seat assembly, the storage sleeve comprising:
    a frame extending around at least a portion of the periphery of the storage sleeve;
    a wall at least partially extending within an area between a first side portion of the frame and a second side portion of the frame; and
    a first retention component at least partially retained within the frame, with at least a first end of the first retention component extending from the frame, the first end of the first retention component comprising a fastening mechanism for removably attaching the first retention component to the surface of the seat,
    wherein the retention component is configured to expand from a first effective length between the first end and a second end of the retention component to a second effective length between the first end and the second end of the retention component.

2. The seat assembly of claim 1, wherein the first retention component comprises one or more inelastic portions and one or more expandable portions, wherein the one or more expandable portions are configured to allow the first retention component to expand from the first effective length to the second effective length.

3. The seat assembly of claim 2, wherein the first retention component comprises at least two inelastic portions and at least one expandable portion positioned between the at least two inelastic portions.

4. The seat assembly of claim 1, wherein the first retention component comprises one or more restriction portions configured to inhibit expansion of the first retention component beyond the second effective length.

5. The seat assembly of claim 4, wherein the one or more restriction portions is formed from an inelastic material.

6. The seat assembly of claim 4, wherein the one or more restriction portions forms part of the one or more inelastic portions.

7. The seat assembly of claim 1, wherein the fastening mechanism of the first end of the first retention component is a hook-and-loop fastener.

8. The seat assembly of claim 1, wherein the first retention component is positioned at or proximate a top side of the storage sleeve.

9. The seat assembly of claim 1, wherein the frame comprises a channel within the frame.

10. The seat assembly of claim 9, wherein at least a portion of the first retention component is positioned within the channel to at least partially retain the first retention component within the frame.

11. The seat assembly of claim 1, further comprising a second retention component coupled to the frame, the second retention component comprising a fastener configured to removably couple to the surface.

12. The seat assembly of claim 11, wherein the second retention component is coupled at or proximate a bottom side of the frame.

13. The seat assembly of claim 11, wherein the second retention component is configured to allow the frame to pivot relative to the surface.

14. The seat assembly of claim 1, wherein the frame is formed from a rigid material.

15. The seat assembly of claim 1, wherein the wall is formed from a rigid material.

16. The seat assembly of claim 1, wherein the wall comprises a mesh or netting material.

17. A seat assembly comprising a spreader configured to increase storage space beneath the seat assembly, the spreader comprising:
- a body portion comprising a first end having a first aperture configured to be coupled to a fore tube of a connection assembly of the seat assembly, and an aft portion having an aft aperture configured to be coupled to an aft tube of the connection assembly,
- wherein the body portion further comprises a recessed portion positioned along a bottom side of the spreader, the recessed portion comprising a top portion and an aft surface that converge at a corner adjacent the aft aperture, the top portion extending substantially a length between the first end of the body portion and the aft portion of the body portion,
- wherein the top portion and aft surface are shaped to receive an electronic box, with a planar top surface of the electronic box being adjacent the top portion of the recessed area for substantially the length between the first end of the body portion and the aft portion of the body portion, and with an aft portion of the electronic box being adjacent the aft surface of the recessed area, and
- wherein the corner is positioned above a longitudinal axis of the aft aperture, to allow for increased storage space beneath the electronic box.

18. The seat assembly of claim 17, further comprising:
- a first seat back pivotally coupled to the body portion and positioned adjacent a first side of the body portion;
- a second seat back pivotally coupled to the body portion and positioned adjacent a second side of the body portion, the second side being opposite the first side;
- a first actuator positioned between the fore tube and the aft tube, the first actuator operably coupled to the first seat back; and
- a second actuator positioned between the fore tube and the aft tube, the second actuator operably coupled to the second seat back,
- wherein the recessed portion is configured such that the electronic box can be positioned between the first actuator and the second actuator.

* * * * *